US009745951B1

(12) United States Patent
Doyle

(10) Patent No.: US 9,745,951 B1
(45) Date of Patent: Aug. 29, 2017

(54) SELF-POSITIONING ROBOTIC SUBSEA POWER GENERATION SYSTEM

(71) Applicant: Robert E. Doyle, Houston, TX (US)

(72) Inventor: Robert E. Doyle, Houston, TX (US)

( * ) Notice: Subject to any disclaimer, the term of this patent is extended or adjusted under 35 U.S.C. 154(b) by 0 days.

(21) Appl. No.: 15/345,264

(22) Filed: Nov. 7, 2016

(51) Int. Cl.
| | |
|---|---|
| F03B 13/00 | (2006.01) |
| F03B 13/10 | (2006.01) |
| H02P 9/04 | (2006.01) |
| F03B 15/06 | (2006.01) |
| F03B 17/06 | (2006.01) |
| H02K 7/18 | (2006.01) |
| F01D 25/28 | (2006.01) |
| F03D 11/04 | (2006.01) |

(52) U.S. Cl.
CPC ............ *F03B 15/06* (2013.01); *F03B 17/061* (2013.01); *H02K 7/1823* (2013.01); *F05B 2220/32* (2013.01); *F05B 2240/97* (2013.01)

(58) Field of Classification Search
USPC ......................................... 290/43, 54; 415/7
See application file for complete search history.

(56) References Cited

U.S. PATENT DOCUMENTS

| | | | | |
|---|---|---|---|---|
| 2,501,696 | A | * 3/1950 | Souczek | F03B 17/061 |
| | | | | 290/43 |
| 3,986,787 | A | 10/1976 | Mouton, Jr. et al. | |
| 4,025,220 | A | * 5/1977 | Thompson | F03B 17/061 |
| | | | | 415/121.2 |
| 4,124,182 | A | * 11/1978 | Loeb | F03D 5/00 |
| | | | | 244/153 R |
| 4,163,904 | A | 8/1979 | Skendrovic | |
| 4,219,303 | A | 8/1980 | Mouton, Jr. et al. | |
| 4,224,527 | A | 9/1980 | Thompson | |
| 4,313,059 | A | * 1/1982 | Howard | F03B 17/06 |
| | | | | 290/43 |
| 4,383,182 | A | 5/1983 | Bowley | |
| 6,091,161 | A | 7/2000 | Dehlsen et al. | |

(Continued)

FOREIGN PATENT DOCUMENTS

WO    WO2015/142737 A1    9/2015

*Primary Examiner* — Pedro J Cuevas
(74) *Attorney, Agent, or Firm* — Law Offices of Mark L. Berrier

(57) ABSTRACT

A self-propelled, robotic power generating system remains submerged in deep water areas, tethered within steady-state, generally unidirectional sea currents in non-tidal areas for the continuous production of turbine-generated electricity that is transmittable by multipurpose undersea power cable to onshore electric grids. System aspects include a shore-to-system communication means to remotely manage all system functions; a sea current intake consisting of a cone-like, retractable current amplifier to significantly increase the energy density of the currents passing through the amplifier to the turbine; a self propulsion means to move the system to maintain a desirable location within a prescribed area that may be subject to meandering currents; a snorkel-like vertical air conduit for ballast control; a seawater pumping means for ballast control; a retractable marine wildlife protector to cover the sea current intake; and a remotely retractable anchor means to maintain the generating system in a target position for extended time periods.

16 Claims, 15 Drawing Sheets

(56) References Cited

U.S. PATENT DOCUMENTS

| | | | | |
|---|---|---|---|---|
| 6,168,373 | B1* | 1/2001 | Vauthier | F03B 13/10 415/221 |
| 6,531,788 | B2* | 3/2003 | Robson | F03B 17/061 290/42 |
| 7,199,484 | B2* | 4/2007 | Brashears | F03B 13/10 290/42 |
| 7,291,936 | B1* | 11/2007 | Robson | F03B 13/264 290/43 |
| 7,331,762 | B2* | 2/2008 | Fraenkel | F03B 17/061 416/244 R |
| 7,441,988 | B2* | 10/2008 | Manchester | F03B 13/10 290/54 |
| 7,471,009 | B2* | 12/2008 | Davis | F03B 3/128 290/43 |
| 7,489,046 | B2* | 2/2009 | Costin | F03B 17/061 290/43 |
| 7,530,224 | B2* | 5/2009 | Fraenkel | F03B 17/061 60/398 |
| 7,541,688 | B2* | 6/2009 | Mackie | F03B 13/26 290/54 |
| 7,682,126 | B2* | 3/2010 | Parker | F03B 17/061 415/3.1 |
| 7,737,570 | B2* | 6/2010 | Costin | F03B 17/061 290/43 |
| 7,768,145 | B2 | 8/2010 | Susman et al. | |
| 7,851,936 | B2* | 12/2010 | Bolin | F03B 13/10 290/43 |
| 7,939,957 | B2* | 5/2011 | Costin | F03B 17/061 290/43 |
| 8,022,567 | B2* | 9/2011 | Davis | F03B 3/128 290/54 |
| 8,102,071 | B2* | 1/2012 | Catlin | F03B 13/264 290/43 |
| 8,219,257 | B2* | 7/2012 | Hunt | B63B 21/50 290/42 |
| 8,237,304 | B2* | 8/2012 | Dehlsen | B63B 21/50 290/43 |
| 8,246,293 | B2* | 8/2012 | Landberg | F03B 17/00 290/42 |
| 8,272,831 | B2 | 9/2012 | Johnston | |
| 8,288,882 | B2* | 10/2012 | Bolin | F03B 17/061 290/43 |
| 8,393,850 | B2* | 3/2013 | Werle | F03D 1/04 415/7 |
| 8,398,334 | B1 | 3/2013 | Doyle | |
| 8,421,260 | B2* | 4/2013 | Duke | F03B 13/10 290/54 |
| 8,506,244 | B2* | 8/2013 | McBride | F03B 3/02 415/204 |
| 8,558,403 | B2* | 10/2013 | Rooney | F03B 13/10 290/43 |
| 8,579,576 | B2* | 11/2013 | Fraenkel | F03B 17/061 415/4.3 |
| 8,633,609 | B2* | 1/2014 | Cornelius | E02B 9/00 290/54 |
| 8,766,466 | B2* | 7/2014 | Dehlsen | F03B 17/061 290/43 |
| 8,963,362 | B2* | 2/2015 | Sia | F03D 5/00 290/44 |
| 9,080,548 | B2* | 7/2015 | Dehlsen | F03B 17/061 |
| 9,234,501 | B2* | 1/2016 | Sia | F03D 5/00 |
| 9,334,849 | B2 | 5/2016 | Dehlsen | |
| 9,382,895 | B2* | 7/2016 | Lin | F03B 17/061 |
| 9,447,775 | B2* | 9/2016 | Sia | F03D 5/00 |
| 9,488,155 | B2* | 11/2016 | Kehr | H02K 7/1823 |
| 2002/0088222 | A1* | 7/2002 | Vauthier | F03B 17/061 60/398 |
| 2007/0096472 | A1* | 5/2007 | Mondl | F03B 13/26 290/54 |
| 2014/0090590 | A1* | 4/2014 | Maurer | B63G 8/18 114/330 |
| 2016/0108894 | A1* | 4/2016 | Sia | F03D 5/00 290/54 |
| 2017/0175699 | A1* | 6/2017 | Bolin | F03B 13/10 |

* cited by examiner

SELF-POSITIONING ROBOTIC SUBSEA POWER GENERATION SYSTEM

TECHNICAL FIELD OF THE INVENTION

The present invention relates in general to systems for the generation of electricity through renewable means such as water-driven turbines. More specifically, the present disclosure relates to turbine generator systems that remote-controllably convert nontidal high seas current energy to low cost electricity where the systems are self-propelled and submersible containing current amplifiers and marine life protectors.

BACKGROUND OF THE INVENTION

The cost of power in the United States is one of the most expensive cost of living elements incurred by the consumer. This makes finding less expensive sources of electricity of paramount importance for the continued economic vitality of the country. Depending mainly upon the geographic location and the source of power generation, these costs may vary considerably. This is clear from the following comparative listing of power sources, a five-year forecast of the estimated U.S. average power costs in dollars per kilowatt hour for most regular and renewable sources of energy as prepared by the U.S. Energy Information Agency (EIA) as of 2015:

| | |
|---|---|
| Geothermal | $.048/kwh |
| Onshore Wind | .074 |
| Hydro | .083 |
| Conventional Coal | .095 |
| Advanced Nuclear | .095 |
| Biomass | .100 |
| Advanced Turbine, Natural Gas | .113 |
| Solar, Photovoltaic | .125 |
| Offshore Wind | .197 |
| Concentrated Solar Power | .240 |

The above $/kwh listing represents the EIA's estimated levelized cost of electricity (LCOE) and is a measure of a power source which attempts to compare different methods of electricity generation on a comparable basis. It is an economic assessment of the average total cost to build and operate a power-generating asset over its lifetime divided by the total energy output of the asset over that lifetime. The LCOE can also be regarded as the minimum cost at which electricity must be sold in order to break-even over the lifetime of the project.

By comparison, the LCOE for several versions of this invention was estimated to be in the order of $0.045/kwh, or about the same low cost as geothermal.

Our above LCOE for this invention was computed on the same basis as that of the EIA in that our cost range consisted of the capital to build and to operate the present invention including all maintenance, overhead and interest expenses over the asset lifetime divided by the total energy output of the asset over that lifetime. Our estimates thus indicate that the present invention has the potential of saving the public substantial expenses for future power costs.

It has been well established that renewable energy is a more desirable power source alternative than other fuel means since it is much cleaner than fossil fuel, far safer than nuclear energy and is abundant. Solar, offshore and onshore wind projects require extensive areas for operation, may be environmentally disruptive and are generally expensive and considered by many to be unsightly. Geothermal, onshore wind and inland hydro may also be unsightly and environmentally disruptive but are the least expensive of the alternative energy power sources. However, they are less desirable for investment for generation purposes owing to the general scarcity of their areas for suitable economic operation. Thus marine currents offer attractive potential for a source of power since the cost will generally be lower for certain types, the systems are usually submerged out of sight and the area of suitable ocean current availability is the most extensive available. These factors probably account for the present increase in tidal current programs throughout the world although such programs may be problematic owing to high installation cost and environmental impact. However, at this time there are no known commercially active power generation systems designed for operating in the high seas in non-tidal areas except for this invention.

Excluding offshore wind projects, virtually all renewable ocean power generation systems in use today extract energy from tidal mechanisms that rely on water moving alternatively in two directions where the full generation of power is limited to somewhat less than a full day. Such systems are located at or near shallow edge water areas where environmental conditions may be disrupted and their presence may be unsightly. This is especially true of power generation systems requiring the building of extensive shoreline embankments or levees to form lagoons that temporarily retain and store incoming seawater for release during periods when the tide recedes. The lagoon systems can be unsightly and all are expensive to build because of the often extensive land work needed to build the levees. Such expenses must be passed on as the cost of power to the consumer. Other tidal systems may be comprised of a free standing submerged turbine generators that are mounted on large stands or on buried foundations located in shallow waters where there is a significant danger to marine life and may be a hazard to water sports and other surface activity. Tidal energy is harnessed in a cyclical manner from the incoming and outgoing currents resulting in a discontinuous pattern of electricity generated.

In the past, various patents have addressed the issue of using the hydrodynamic force of water to generate power. For example, U.S. Pat. No. 3,986,787 issued to Mouton and Thompson and published on Oct. 19, 1976, describes a platform upon which is mounted above water an electrical power generator connected by a drive belt to an underwater turbine wheel on a horizontal shaft that is coaxially mounted below the platform within an intake nozzle in a river current. The system is manually transported and anchored to the river bottom to a location where it remains floating at the surface where it may be subject to accident with surface marine traffic; it has no means of amplifying the ocean current speed.

U.S. Pat. No. 4,163,904 issued to Lawrence Skendrovic and published on Aug. 7, 1979, provides for a turbine plant anchored to the sea floor that provides for generating electrical power by means of the flow of coastal water currents. Each turbine plant has a large central opening within which is mounted a large turbine impeller. An electrical generator is mounted within the watertight housing of the plant adjacent to the central opening. The opening of the plant has a large diametrical forward entrance and a large diametrical rearward exit with a substantially central portion of smaller diametrical extent. The impeller of the turbine plant is mounted in the smallest diametrical extent of the opening. The contour of the opening provides for a Venturi effect increasing the efficiency of plant operation. The system is manually transported and anchored to the river bottom but has no means of amplifying the ocean current speed.

U.S. Pat. No. 4,219,303 granted to Mouton and Thompson and published on Aug. 26, 1977, calls for a power plant for the generation of electricity from the flow of water currents that uses turbine wheels within nozzles submerged in the water current, anchored to the bottom of the water course, as for example, the ocean, and self-buoyed to a level well below the water surface. Pairs of counter-rotating turbines are supported by their rims, which bear against friction drive wheels, which in turn drive electrical generators contained in water-tight deep-water machine rooms within the wall of the nozzle. The system is manually transported to the selected site then anchored to the sea bottom where the elevation of the system above the sea floor is manually set; it has no means of amplifying the ocean current speed.

U.S. Pat. No. 4,224,527 received by Jack E. Thompson and published on Sep. 23, 1980, wherein he describes a method of intensifying a relatively slow speed, substantially horizontal flow of a natural fluid, such as a tidal flow, as opposed to a tidal rise, or a river flow, the natural flow being used to turn about a substantially horizontal axis rotary means arranged to act directly on a working fluid, which may be the natural fluid, where the latter is a liquid, or a separate liquid, and force it through a pipe system to a flow intensifier in the form of a constriction anchored to the floor of the body of water. The working liquid is forced through the pipe system without the formation of a head, and can be used to drive means for generating electricity. Flow intensifying apparatus is also described using seawater as the natural fluid and either fresh water or the seawater as the working fluid. Several of the apparatus may be disposed to cause a vortex or maelstrom which then serves to drive the apparatus which must be set manually. It has no means of amplifying the ocean current speed and offers no protection for marine life.

U.S. Pat. No. 4,383,182 granted to Wallace W. Bowley and published on May 10, 1983 is based on energy being produced in a power producing module by means of a turbine energized by ocean currents where a shaft rotationally connecting the turbine to a pump then moves a system fluid that is conveyed from the power producing module to a separate power absorbing module by means of piping; the moving system fluid then drives a turbine in the power absorbing module where a turbine is axially connected to a generator that rotationally produces power. He relates that large quantities of power may be produced in this manner by coupling several such power producing modules to the power absorbing module and thence to a power grid for sales. The system must be transported and positioned manually; it has no means of amplifying the ocean current speed and offers no protection for marine life.

U.S. Pat. No. 7,768,145 received by Hector Fillipus, Alexander Van, Drentham Susman, Kenneth Stewart and Donald Stewart, published on Aug. 3, 2010, relates to an underwater turbine unit housed in a cylindrical body and connected rotationally to a electrical power generator mounted on the seafloor in shallow water to capture energy from reversing tidal ocean currents. A multiplicity of such turbine generators are connected to a power center for transfer by cable to shore. The system must be transported and positioned manually; it has no means of amplifying the ocean current speed and offers no protection for marine life.

US WO2015142737 A1 credited to James G. P. Dehlsen and published on Sep. 24, 2015, provides for a floating tower frame for a plurality of connected turbine systems placed in ocean currents for the purpose of generating electrical power or high pressure seawater for reverse osmosis or fresh water production from steady (gyre) or tidal currents. The subsea turbines are mounted near the base of a plurality of floating towers held in parallel between a horizontal truss structure above water and a horizontal wing at the base of the towers, below the surface. Part of the structure is above water and subject to the risk of an accident with marine traffic. Further, the system must be transported and positioned manually; it has no means of amplifying the ocean current speed and offers no protection for marine life.

U.S. Pat. No. 6,091,161 registered to James G. P. Dehlsen, James B. Dehlsen and Geoffrey F. Deane was published on Jul. 18, 2000. This art form may be described as two tethered, submerged, ocean current-driven turbines with counter-rotating, variable pitch blades. The two turbines are axially connected to separate electric generators and are joined by a water-wing like structure having a canard-like device located centrally on the wing to assist in controlling the depth of the system. This power-generating device may be set to a predetermined maximum depth and a predetermined minimum depth in addition to the selective setting of a sensing depth involving an ascend command or a descend command where the operating depth of the system is midway between the predetermined maximum depth and the predetermined minimum depth. Further, the system must be transported and positioned manually; it has no means of amplifying the ocean current speed and offers no protection for marine life.

U.S. Pat. No. 8,272,831 issued to Barry Johnston and published Sep. 25, 2012, is comprised of an apparatus for the generation of power from sea currents that includes an elongate, generally circular in cross section, free floating tubular buoyancy vessel having affixed to its underside on a mounting means, rotatable rotor blades. The rotor blades are connected to a power generating means whereby the movement of sea water currents across the rotor blades, drives them so as to generate power. The apparatus is tethered to the sea bottom or other fixed point where power is exported by cable attached to the tether line. The system must be transported and positioned manually; it has no means of amplifying the ocean current speed and offers no protection for marine life.

SUMMARY OF THE INVENTION

Except for those prior art devices that are offshore wind driven power generation systems, prior hydrodynamic art systems provide only for tidal operation but not for nontidal, high seas power generation. Those offshore wind-driven power generation systems that operate on the surface of high seas require substantial room, appear unsightly, result in high cost power and may be a hazard to marine water fowl and to surface traffic. As noted earlier, the remaining tidal and other onshore power generation systems also have serious unsightly appearance, environmental issues and safety problems.

The prior art power generator systems are essentially all burdened with a high cost to produce electricity thus resulting in an excessive charge of power to the consumer. For example, the country of Denmark currently relies on wind turbines for 42% of their electricity. Danish consumers now pay the highest electricity charges in Europe owing to expensive offshore and onshore wind-generated power. Reliability has also become a serious problem since on some days the Danish wind farms produce more electricity than required while on other days the turbines are still and power from expensive storage batteries must be used. Germany and Great Britain are now having similar problems and are scaling back plans for wind energy. In addition to high capital and operating costs, the hazard to wildlife and the unsightly appearance are also contributing factors to the unpopularity of wind farms.

Wind energy is not an isolated case since tidal current power generators that are planned, being installed or are operating in shoreline areas of Great Britain and northwestern Europe will produce power at high costs with various levels of environmental difficulties. As noted herein, certain extreme cases of tidal energy generation require a man-made levee or berm in which to temporarily trap tidal sea water for operation. These types of tidal energy generators could have a serious impact on the environment while their construction costs must be paid by the end user customer in the form of higher electric costs.

Relative to the prior art, there remains a need for a renewable energy generating system that is submersible and self positioning that can operate safely in non-tidal, deep water areas and safely below marine surface traffic in a manner that would not be unsightly or harm the marine environment. The system must be capable of economically generating power from high and lower speed currents in order to be applicable in worldwide bodies of water. But the system must also be capable of moving to new locations to capture the energy of fast, meandering ocean currents. Such a system must be capable of producing large amounts of continuous clean power at a cost to the consumer below that of fossil fuel systems such as natural gas and within required environmental parameters. For optimum operations the system must be continuously controlled at all times by either live operators or by programmed software within defined limits and monitored onshore by live operators. The present invention embodies these features.

One of the major issues in converting non-tidal sea currents to electric power is the relatively slow speed of most ocean currents that cover very large areas as opposed to the generally much faster tidal currents that are usually located in remote areas of smaller areal size. To increase current speeds in all ocean current areas, the proposed invention provides for a cone-like current amplifier where sea currents are accelerated to much higher levels based on the Bernoulli Principle as demonstrated in this document. This concept was formulated by Daniel Bernoulli in 1738 and has been utilized extensively since that time in the fluid flow analyses of air, water and other fluids. The geometric form of the Bernoulli Principle as applied for the proposed invention is a truncated cone with water entering the large end and exiting at a much higher speed at the small end as demonstrated herein. This is a valuable concept since seawater currents may be accelerated using a current amplifier by a factor of from 7 to over 9, depending upon the turbine design, ratio of cone intake to outlet diameters and other physical factors. The present invention utilizes this principle.

Another of the major issues in converting non-tidal sea currents to power is maintaining the location of the generating system within the area of maximum current speeds for greatest turbine rotation and power generation. Studies have demonstrated the meandering aspect of currents in many regions such as the Florida Straits where the high speeds of "jet stream" shallower currents are some of the highest velocities in the world but are capable of changing their location over time as discovered by oceanic field studies. Oceanographic studies reveal that these currents have their highest speeds closer to the surface. Today, these high speed meandering surface currents may be continuously monitored from shore to distant offshore areas by high frequency radar. Onshore operators of the proposed invention will utilize this type of radar in selecting certain areas of maximum current velocity and will then move the invention remotely by self-propelled means to that selected area, remotely anchor the system and then produce power at a lower cost in the higher speed currents. Such a power generating system would be of great benefit to developing coastal and other similar countries having substantial power needs. The present invention utilizes a self-propelled means and relies on high frequency radar for detection of high speed current areas.

Aspects of the present invention provide for the generation of electric power from ocean currents. More specifically, aspects of the present invention provide for power generation from generally unidirectional high speed shallower non-tidal currents in the high seas. A system based on the present invention may be deployed in any body of water having moving currents.

Example Operation

The operation of the present invention may be best examined through the description of an example of a typical move of the invention to a new location. The setting for a new location would be in the Florida Straits, or similar areas worldwide, where the surface current speeds of the south-to-north traveling currents are high and may exceed five knots in shallower depths at some distance eastward from shore. It is important to note that the fast moving currents generally take the form of a water "jet stream" within the ocean and are often of a meandering nature. The water depths in these areas are about 400 meters. The invention would be positioned offshore near the deep water end of a previously laid and buried power trunk line that would extend from a onshore power grid location and eastward at a right angle to a distance of least 16 kilometers from the Florida shoreline. The power trunk line will have a plurality of connecting points along its length that extend vertically a short distance above the ocean floor. Any single connecting point on the power trunk line may be coupled to the branch power transmission line, referred to herein as the power and utility line that is contained and stored reelably within the invention in order to transfer generated electricity to the trunk line and into to the onshore power grid location. The connections may be made with remotely operated vehicles or ROV's that are used extensively in the offshore oil industry for such mechanical operations.

Basically the embodiments of the present disclosure consist of a large truncated cone-like submerged device that is remotely collapsible in an umbrella-like fashion and is referred to as a current amplifier. It is constructed of a rigid metal frame covered by flexible urethane sheeting or similar material, the large end or front of which is the ocean current intake and is joined to, and covered by a metal gridwork called a marine life protector that is also collapsible in an umbrella-like fashion simultaneously with the current amplifier. The small end of the current amplifier is coupled to a turbine that is rotationally activated by substantially accelerated sea currents received from the current amplifier and is rotationally connected to a power generator. The rotationally activated power generator then transmits electricity to a reelable power and utility line contained within the body of the invention. The power and utility line is further extended downward to the sea floor where it is coupled to the power trunk line as the means of transmitting electricity to the onshore power grid location. Because of the meandering nature of the faster currents it would be necessary to move the invention on occasion to maintain a position within these currents by means of azimuth thrusters affixed to the invention that provide mobility in any lateral direction. In this embodiment of the invention the power generation system would be transported in an east-west direction along the buried trunk line line and perpendicular to the direction of current travel. Ballast tanks would be utilized for vertical positioning of the invention. The invention would be under the monitoring and operative command of the onshore control center at all times.

The first step in the movement to a new location is the selection by the onshore control center of that offshore area having the greatest ocean surface current speeds as these areas contain the highest energy potential for conversion to power. The invention will be positioned at a depth of about 60 meters and below the keels of large vessels for power generation. Thus a review of surface currents by the onshore control center will be undertaken to locate high current speed areas. Commercial shore entities provide detailed information on the movement of surface currents based on readings from high frequency radar (HFR) installations located onshore near tidal zones. The HFR imagery process is referred to as ionospheric radar or over-the-horizon-radar and is used extensively for a number of offshore applications where large surface areas of up to 200 kilometers from shore may be surveyed. With the use of HFR and satellite imagery, the desired location area of highest current velocities is selected by the onshore control center for placement of the invention as guided by global positing systems or GPS.

The system control memory of the present invention is then supplied with the desired depth and GPS coordinates of the target location area as provided by the onshore control center. The invention begins its journey to the new location while remotely submerged at a depth of about 60 meters and in a transit mode with the current amplifier and marine life protector and all other withdrawable appendages remotely retracted for maximum streamlining and minimum resistance to movement. The turbine blades are remotely locked stationery and neutrally positioned for minimum resistance to forward movement. A plurality of battery-powered, remote controlled azimuth thrusters that propel the device in any lateral direction serve as the means for managing the lateral transit of the invention while ballast tank control serves as the means of vertically positioning the invention. An internal supply of power in the form of high capacity lithium ion batteries or other similar battery forms may be the means of power for the electrically driven azimuth thrusters and ballast water pumps while ballast air may be supplied by high pressure storage bottles. A snorkel-like device may be remotely deployed that may serve as an alternate supply of air and radio communication with the onshore control center in addition to surveillance of surface conditions with a video camera. The onshore control center is in operative command at all times during both transit and while anchored. The invention can also be remotely surfaced using less battery power while in transit for longer travel distances.

Upon arrival at the intended location, the depth to the ocean floor is remotely measured by sonar through the onshore control center followed by the remote setting of the anchors in a pre-selected pattern. If the power and utility line of the invention remains connected to the power trunk line during shorter distance travel to the new location then, following anchoring, the current amplifier and marine life protector are remotely deployed and extended in an umbrella-like fashion by means of an internal mechanical device referred to as a retraction unit where the invention will resemble a large truncated cone with ocean currents entering the large end. The turbine blades are remotely unlocked and positioned for rotating operations. The systems are checked and power generation begins. If the power and utility line of the invention is disconnected from the power trunk line for longer distance travel to the new location then, upon arrival at the new location the power and utility line of the invention is reelably and remotely coupled to a connecting point on the power trunk line by a ROV of the type commonly used in the offshore oil industry for similar remote mechanical operations, systems are checked and power generation begins. The power and utility line is stored reelably in the body of the invention and may be completely retracted for long transit conditions or totally deployed for short transit conditions, depending upon the circumstances.

One general embodiment of the present disclosure is one or more power generation systems for the production of electricity from generally unidirectional currents in a body of water. The system will operate submerged in the body of water and may include: a remote control system connecting the power generation system by fiber optic means or other suitable type of conveyance of operating performance information to onshore management that will then control all operations of the power generation system by the same fiber optic or other means; a truncated cone-shaped current amplifier receives ocean currents at its large end and passes said ocean currents at the small end at a much higher speed to an axially connected cylindrically housed turbine caused to rotate by said currents that is rotationally coupled to a power producing generator further connected by a power transmission cable to an onshore power delivery point; a means of marine transportation for self mobility of the power generation system through a plurality of hydraulic thrusters affixed to the power generation system where said thrusters expel high pressure water in any horizontal direction that may cause horizontal movement to a desired location; a means of vertical control of the power generation system in the form of ballast tanks that may contain various amounts of seawater where said tanks are in hydraulic communication with water pumps; an anchoring means to tether the power generation system so as to maintain it in a desired fixed position; a covering gridwork configured to encircle and cover the large end of the current amplifier so as to protect marine wildlife and prevent other objects from entering the turbine; a motor driven retraction mechanism in operative connection with said current amplifier and marine life protector wherein said mechanism is configured to horizontally retract the joint current amplifier and the marine life protector in an umbrella-like fashion thereby forming a streamlined body to permit ease of movement of the power generation system to different areal locations; following the selection of a specific site and anchoring of the power generating system said retraction mechanism may also open the combined current amplifier and marine life protector in an umbrella-like manner for maximum amplifier image for the purpose of maximizing power generation while protecting marine life; provide the supply of air for buoyancy control when submerged through a flexible, retrievable snorkel-like tubular air conveyance device positioned vertically and in operative communication with said air compressors and the surface for ballast air supply when submerged; an auxiliary communication line affixed lengthwise to said tubular air conveyance device for the purpose of sending and receiving messages when submerged and when in transit; and a video camera whose wiring is affixed lengthwise to said tubular air conveyance device for the purpose of monitoring surface marine traffic when submerged. During transit to different areal locations the power production cable may be reelably retrieved into the power generation system and reconnected following anchoring of the power generation system.

Other possible embodiments of the present disclosure include a self-propelled, remote controlled, submerged power generation system comprising twin buoyancy pods, each flanking and affixed to the pod of a single ocean current powered turbine system in operative communication with onshore management for the purpose of converting renewable hydrodynamic energy from steady-state, generally unidirectional high sea ocean currents to electricity. Said currents may be non-tidal and of a meandering nature. The system comprises: a current amplifier means comprised of a cone-like structure consisting of flexible material held by a rigid framework receiving ocean currents at the larger end coupled at the smaller end to a turbine to cause ocean currents to be conically passed through said amplifier to substantially increase the velocity of the exiting current that is then received by the turbine that is joined rotationally to a generator to create an electric current that is transmitted by power cable connecting the generator to onshore commercial sales; a fiber optic or similar means of communication cable joined lengthwise to said power cable in a continuous manner to receive from the onshore control location such signals as to move the power generation system to a specific location through a self-contained means, then to adjust the vertical position of the system through a self-contained buoyancy means to a specific operating depth below said surface and then to set a plurality of anchors through a self-contained winching means to maintain the system at a specific stationary operating location and depth for power generation operations where said anchors are affixed to the ends of the twin buoyancy pods whose flotation means may be separately controlled to assist in offsetting the effects of torque caused by the rotating turbine.

DESCRIPTION OF THE DRAWINGS

For a more complete understanding of the present invention and the advantages thereof, reference is now made to the following description taken in conjunction with the accompanying Drawings in which

FIG. 1. is a schematic diagram of a submerged subsea power generation system, showing a trunk line on the ocean floor which connects the subsea power generating system to onshore power grid facilities;

FIG. 2 is a left side elevation view of the submerged and retracted power generating system in accordance with the embodiments of the invention and illustrating the retracted form of the invention during transportation and prior to power generation;

FIG. 3 is a top view of the submerged and retracted power generating system in accordance with the embodiments of the invention and illustrating the retracted form of the invention during transportation and prior to power generation;

FIG. 4 is a perspective view of the submerged, anchored and deployed power generating system in accordance with the embodiments of the invention and illustrating the form of the invention during power generation;

FIG. 5 is a left side view of the submerged, anchored and deployed power generating system in accordance with the embodiments of the invention and illustrating the form of the invention during power generation;

FIG. 6 is a top plan view of the submerged, anchored and deployed power generating system in accordance with the embodiments of the invention during power generation and illustrating the line of cross section as presented in FIG. 7;

FIG. 7 is a cross sectional view of the submerged, anchored and deployed power generating system in accordance with the embodiments of the invention taken from the cross section depicted in FIG. 6;

FIG. 8 is a rear view of the submerged, anchored and deployed power generating system in accordance with the embodiments of the invention and illustrating the form of the invention during power generation;

FIG. 9 is a front view of the submerged, anchored and deployed power generating system in accordance with the embodiments of the invention and illustrating the form of the invention during power generation;

FIG. 10 is a control diagram illustrating a system in accordance with embodiments of the invention;

FIG. 11 is a side elevation view of one of the power generating units and has hidden lines which show operation of the retraction unit for the marine life protector;

FIG. 12 and FIG. 13 are partial cutaway drawings of an air supply snorkel which is located near the rear topside of the power generating units, with FIG. 12 showing the snorkel in a retracted position and FIG. 13 showing the snorkel in an extended, or deployed, position;

FIG. 14 and FIG. 15 are partial cutaway drawings of the emergency flotation system;

FIG. 16 is a cutaway drawing for the upper stabilizer-rudder, located near the rear of one of two power generators;

FIG. 17 and FIG. 18 are partial, cutaway views of one of the azimuth thrusters for the power generating system; and FIG. 19 and FIG. 20 are partial cutaway drawings of an anchor cable reel for selectively spooling an anchor cable to secure the power generating units in selected positions within ocean currents.

DETAILED DESCRIPTION OF THE INVENTION

Figure 1:
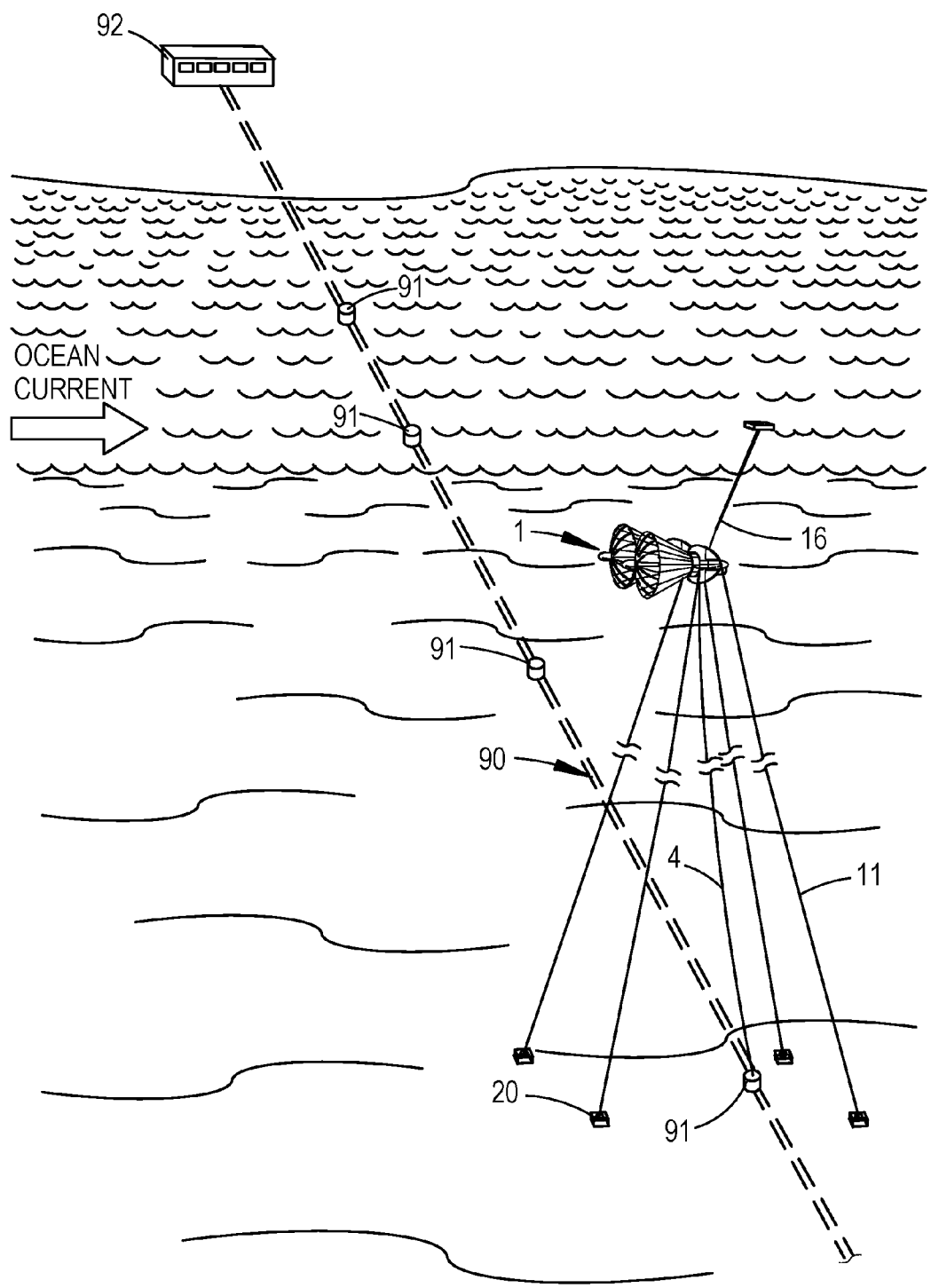
FIGS. 1 through 20 show various aspects for a Self-positioning Robotic Subsea Power Generation System made according to the present invention, as set forth below.

Referring to the Figures, the principles of the invention are explained by describing in detail specific example embodiments of devices, systems and methods for generating electrical power in a body of moving water. Those skilled in the art will understand, however, that the invention may be embodied as many other devices, systems, and methods. Many modifications and variations will be apparent to those of ordinary skill in the art. Embodiments were chosen and described in order to best explain the principles of the invention and the practical application, and to enable others of ordinary skill in the art to understand the invention for various embodiments with various modifications as are suited to the particular use contemplated. The scope of the invention is not intended to be limited by the details of exemplary embodiments described herein. The scope of the invention should be determined through study of the appended claims.

Aspects of the present invention are described below with reference to drawings and flowchart illustrations of methods according to embodiments of the invention. Specific design details have been provided for illustration, but should not be considered limiting. Readers of skill in the art will recognize that many variations of power generation systems may be implemented consistent with the scope of the invention as described by the appended claims.

Generally, aspects of the disclosure concern the generation of electricity by a power generation system in high seas, lagoons, lakes, rivers, reservoirs and other bodies of moving water. Aspects of the present disclosure are unique in that they provide a robotic system that is self-positioning, submersible, offers a current amplification system, marine life protection and continuous monitoring. This power generation system is mobile through the use of electrically-powered water propulsion thrusters located in the stern. This self-propelled feature allows the power generation system to be moved to maintain a desired position within fast moving meandering ocean currents such as those of the Florida Straits. The system also has a retractable aspect that allows the current amplification system and the marine life protection device to be remotely collapsed in an umbrella-like manner for transit. This power generation system has rudder and elevator controls on the stabilizers should secondary horizontal and vertical control be required; normally primary control for these directions may be provided by ballast tank control for vertical movement and azimuth thruster control for horizontal movement either while anchored or in transit. The reelable anchoring system may also offer a means of directional control while stationed at a power generation site since each of the anchor cables may be separately reeled up or down. Following transit to a new location the power generation system may then be anchored by remote control. The power generation system is equipped with an emergency flotation system in the event of an accidental loss of buoyancy.

FIG. 1. is a schematic diagram of power generation system 1 connected to a trunk line 90 which connects the power generation system 1 to onshore power grid facilities 92 and then to customer distribution. The trunk line 90 has a plurality of connecting points 91 spaced apart at regular intervals, in this view showing four of the connection points 91. The power generation system 1 can be connected at various specific connection points 91, thus operating in different regions in the sea where the power generation system 1 may be placed according to the location for optimal sea currents for generating electric power. The power and utility line 4 connects between the power generation system 1 and the connection point 91 of the trunk line 90. The power generation system 1 is preferably self-propelled for moving to a desired location with swift portions of the ocean currents, controlled either by onboard electronics or controlled manually by an operator for moving to a desired location. Anchors 20 are provided for securing to the seabed floor, with anchor cables 11 connecting between the anchors 20 and the power generation system 1. As discussed below in reference to FIGS. 19 and 20, anchor cable reels 45 may be used for fine tuning the position of the power generation system 1 within the swifter portions of the ocean currents.

Figure 2:
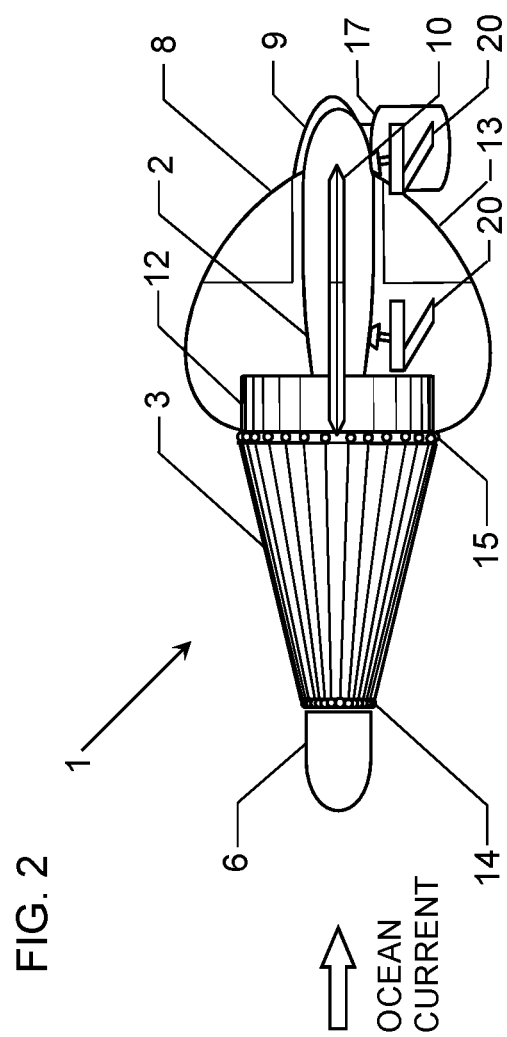

FIG. 2 is an elevation view of the left side of the power generation system 1 in a submerged position where the invention is readied for transit in accordance with embodiments of the present disclosure. As will be apparent in FIG. 3, the side view of FIG. 2 does not reveal the adjacent twin power generating system, the twin of which is located directly behind this view. The current amplifier 3 is retracted in an umbrella-like fashion in order to streamline the exterior of power generation system 1 for minimizing resistance during transit. The turbine 12 with pitch controlled blades (not shown here) is coupled with the current amplifier 3 where it receives high velocity ocean currents when anchored and is further coupled rotationally with power generator 2. Ballast tanks 6 and 9 provide buoyancy and pitch control for the power generation system 1 while in transit, and are automatically governed by system 16 control 29 (not shown here) contained in ballast tank 9 and monitored by the onshore control center. During transit azimuth thruster 17 causes movement in any 360 degree horizontal direction and is the primary lateral control mechanism of power generation system 1 while in transit. The upper stabilizer-rudder 8, the lower stabilizer-rudder 13 and the stabilizer-elevator 10 may provide attitude control of the power generation system 1 generally while anchored but may also provide control while in transit. The upper stabilizer-rudder 8 and lower stabilizer-rudder 13 acting independently or together may control the roll or yaw of the system during movement. Similarly, the stabilizer elevator 10 may control the pitch of the power generation system 1. The action imposed on the current amplifier hinge mechanism 14 and the turbine hinge mechanism 15 allow for the deployment or retraction of the current amplifier 3 and the marine life protector 5 (not shown here) for the initiation of power generation or for transit, respectively. Anchors 20 are retracted as shown during transit.

Figure 3:
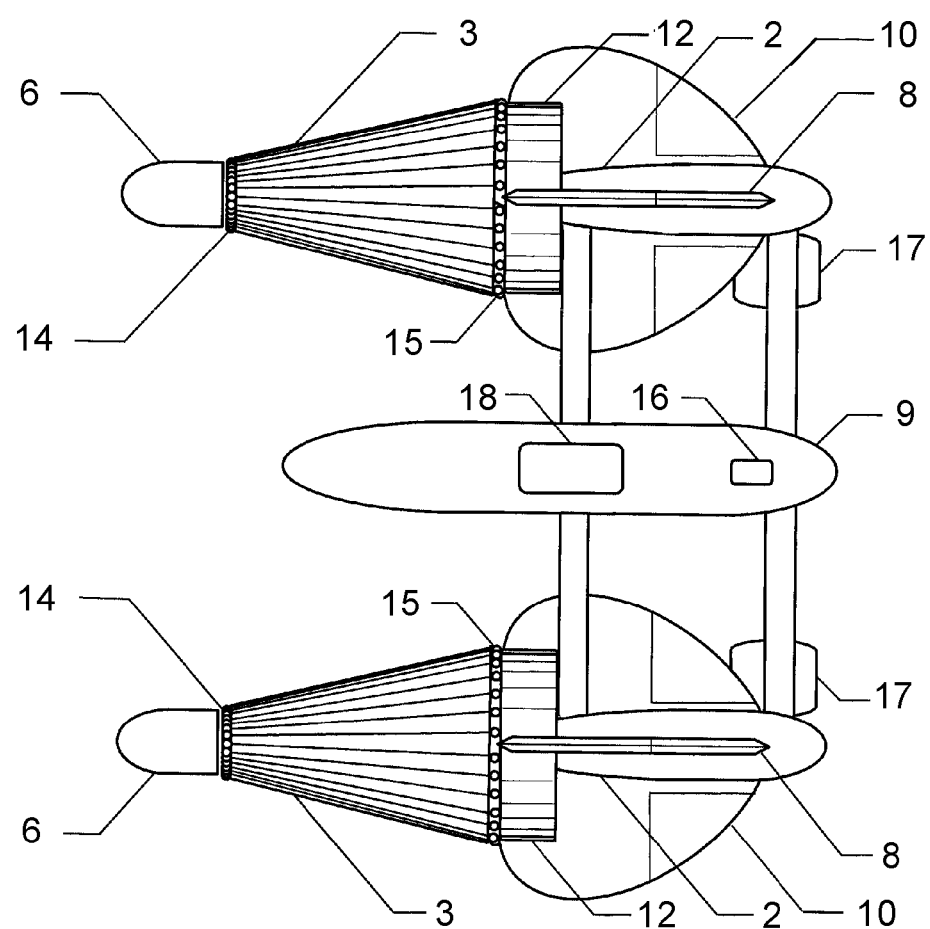

FIG. 3 is a top, plan view of the power generation system 1 in a submerged position where the invention is readied for transit. The current amplifier 3 is retracted in an umbrella-like fashion over the inwardly retracted marine life protector 5 (not visible in this drawing but appears in the remaining illustrations) in order to streamline the exterior of power generation system 1 thus minimizing resistance during transit. The turbine 12 with pitch controlled blades (not shown here) is coupled with the current amplifier 3 where it receives high velocity ocean currents when anchored and is further coupled rotationally with power generator 2. Ballast tanks 6 and 9 provide buoyancy and pitch control for the power generation system 1 while in transit, and are automatically controlled by a system control 29 contained in ballast tank 9 and monitored by onshore management. During transit azimuth thruster 17 causes movement in any 360 degree horizontal direction and is the primary lateral control mechanism of power generation system 1 while in transit. The upper stabilizer-rudder 8, the lower stabilizer-rudder 13 (not shown here) and the stabilizer-elevator 10 may provide attitude control of the power generation system 1 generally while anchored but may also provide control while in transit. The action imposed on the current amplifier hinge mechanism 14 and the turbine hinge mechanism 15 allow for the deployment or retraction of the current amplifier 3 and the marine life protector 5 (not shown here) for the initiation of power generation or for transit, respectively. Communication means may be sent and received during transit by tube-like snorkel 16 (not deployed here) which also serves as a visual means for surface cameras and as a means of conveying air from the surface to the power generation system 1 for ballast control. The emergency flotation system 18 may be activated automatically or manually by shore management. Anchors 20 (not shown here) are retracted during transit.

Figure 4:
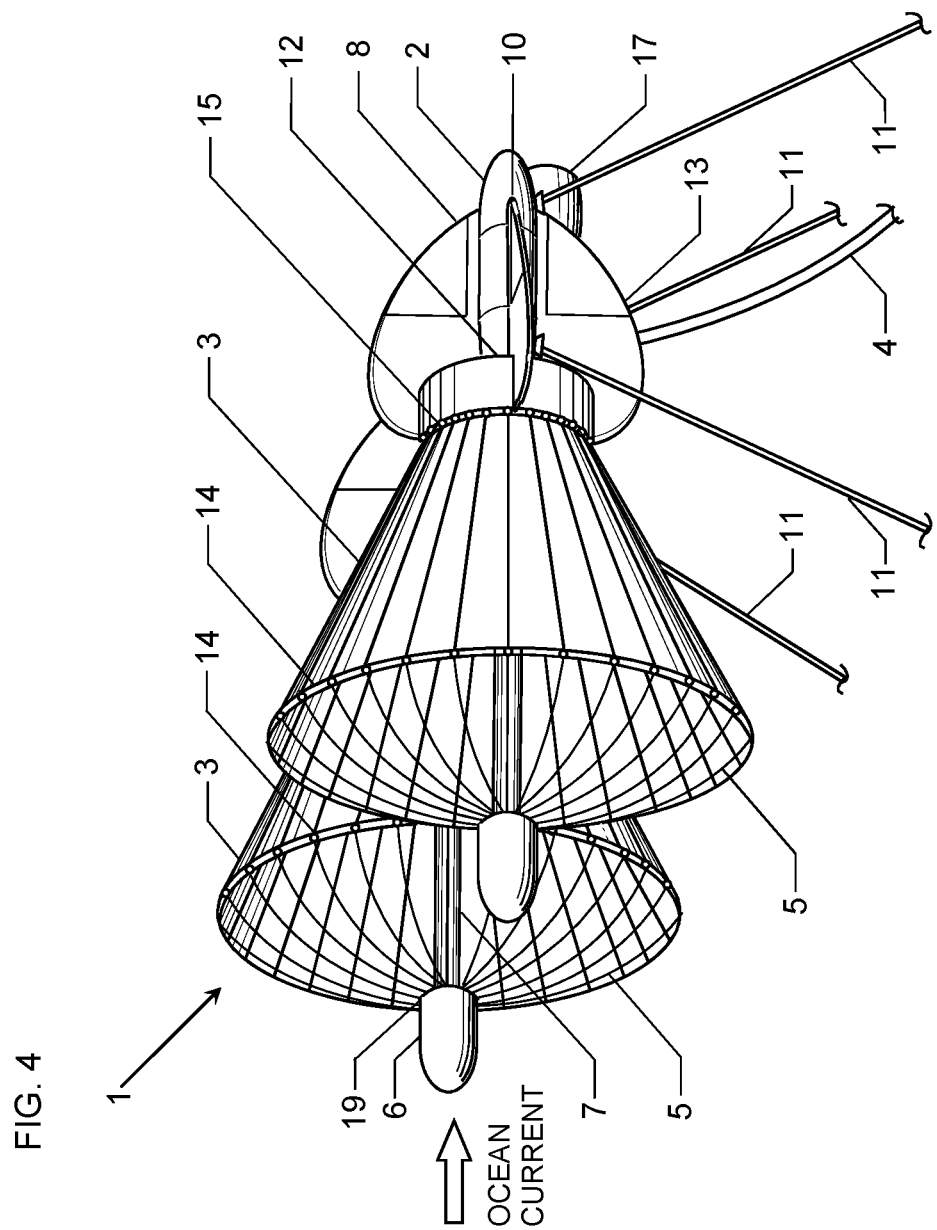

FIG. 4 is a perspective view of power generation system 1 in a submerged position and anchored for power generation in accordance with embodiments of the present disclosure. This view shows that power generation system 1 is comprised of two interconnected cone-like systems containing counter rotating turbines with adjustable blades (not shown here) that are moved rotationally by ocean currents. The purpose of the counter rotating movement is to eliminate torque that may be caused by rotating equipment. The four anchor cable 11 systems for this example are remotely set in a pattern upon arrival at the offshore site to maintain the power generation system 1 in a fixed and specified position. Only the upper part of the anchor cable 11 systems are shown here. The current amplifier 3 and marine life protector 5 are opened in umbrella-like fashion as seen here to capture large volumes of sea currents for power generation. Ocean currents first enter power generation system 1 around bow ballast tank 6, marine life protector hinge mechanism 19 and retraction unit 7, and through the marine life protector 5 and current amplifier hinge mechanism 14 and into the current amplifier 3 where the currents are accelerated to a much higher level as they enter through the turbine hinge mechanism 15, then through the turbine 12 where the hydraulic force of the ocean currents causes rotational movement of the axially connected power generator 2 such that the generated electricity is transported to shore for commercial use by the reelable power and utility line 4. The ocean currents continue movement over flow control surfaces as seen by stabilizer-elevator 10, upper stabilizer rudder 8 and azimuth thruster 17.

All operations for the equipment shown in FIG. 4 are monitored through fiber optic or similar communication means by system control 29 (not shown here) and contained in power and utility line 4 where electronic operating commands are also sent from the onshore control center to power generation system 1; emergency power may also be transmitted from shore by means of power and utility line 4. Said communication means may alternatively be sent and received by radio means either while anchored or during transit through snorkel 16, a vertical tubular device which also serves as a means of conveying air from the surface to the power generation system 1 as required for ballast control either while anchored or during transit. Snorkel 16 may also contain a video camera to monitor surface activities. Air for ballast control purposes may also be provided by auxiliary compressed air bottles mounted within the ballast tank-utilities 9 housing (not shown here) where such control mechanisms are in active communication with shore management.

Figure 5:
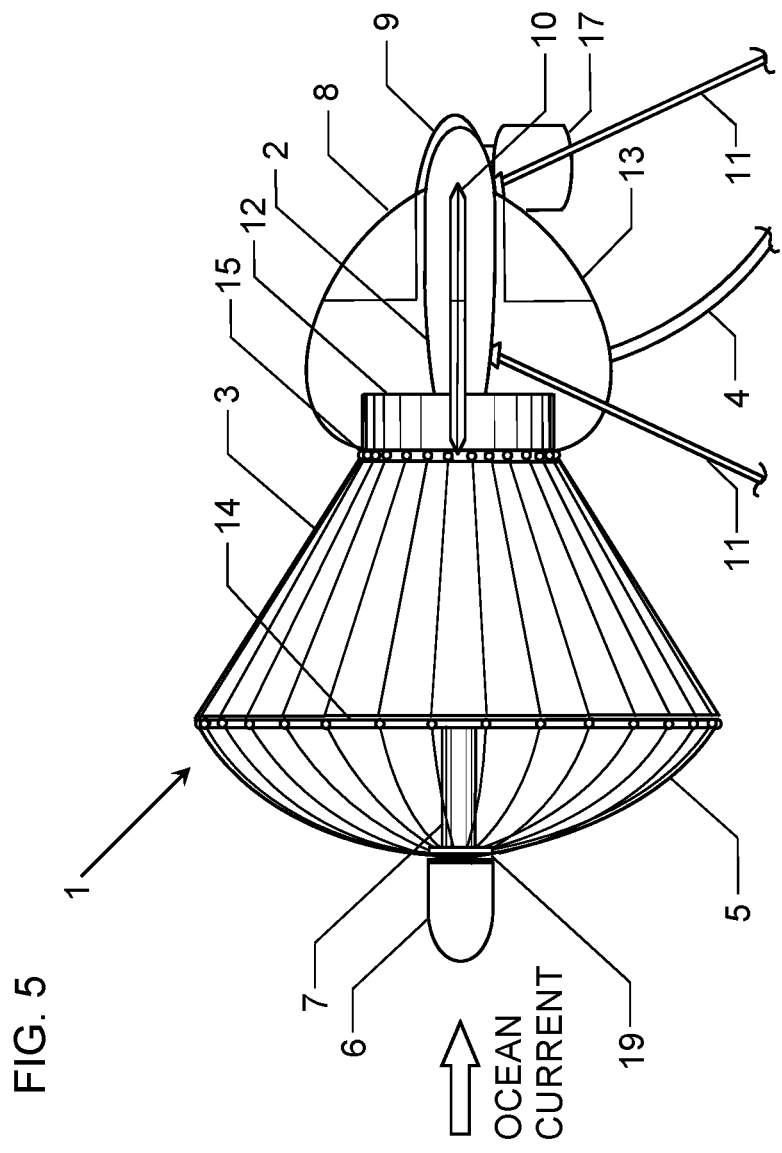

FIG. 5 is a view of the left side of the power generation system 1 in a submerged position where the deployed invention is held stationary by a plurality of anchor cable 11 and readied for power generation in accordance with embodiments of the present disclosure. This side view does not reveal the adjacent twin power generating system 18 that is directly behind this view. The current amplifier 3 is comprised of a metallic frame covered with high-strength, flexible polyurethane material for this example and is extended umbrella-like and coupled at the current amplifier hinge mechanism 14 to the marine life protector 5 which is comprised of a metallic grid-like guard extending over the intake of the current amplifier 3 in order to prevent sea life and other objects from passing into the turbine 12. The retraction unit 7 telescopically moves horizontally inward or outward thereby activating the coupled current amplifier hinge mechanism 14, the turbine hinge mechanism 15 and the marine life protector hinge mechanism 19 to be moved so as to mechanically deploy or retract the current amplifier 3 and the marine life protector 5. The turbine 12 receives high velocity ocean currents from the current amplifier 3 and is coupled rotationally with power generator 2. The power generated is then transmitted to onshore commercial markets through the reelable power and utility line 4 that carries electricity from power generation system 1 in addition to transmitting monitoring information to the onshore control center through system control 29 (not shown) contained in ballast tank-utilities 9. Power and utility line 4 also transmits operating commands from the onshore control center to system control 29 (not shown).

Ballast tanks 6 and 9 provide buoyancy and pitch control, and are automatically governed by the system control 29 (not shown) contained in ballast tank 9 and monitored by onshore control center. In this version there are four anchor cable 11 systems that may be withdrawn for transit or may be lowered and set to retain the power generation system 1 in a specified location and these anchor lines are located at the bow and stern ends of the power generator 2 housings. Azimuth thruster 17 causes movement in any 360 degree horizontal direction and is the primary control mechanism of power generation system 1 and is generally employed while in transit where it is supplied power by high capacity batteries. The upper stabilizer-rudder 8, the lower stabilizer-rudder 13, and the stabilizer-elevator 10 may provide attitude control of the power generation system 1 while anchored or during transit. The upper stabilizer-rudder 8 and lower stabilizer-rudder 13 acting independently or together may control the roll or yaw of the system. Similarly, the stabilizer-elevator 10 may control the pitch of the power generation system 1. The control center commands are imposed through the system control 29 (not shown here) contained in ballast tank 9 on the current amplifier hinge mechanism 14, the turbine hinge mechanism 15 and the marine life protector hinge mechanism 19 allow for the deployment or retraction of the current amplifier 3 and the marine life protector 5 for the initiation of power generation or for transit.

Figure 6:
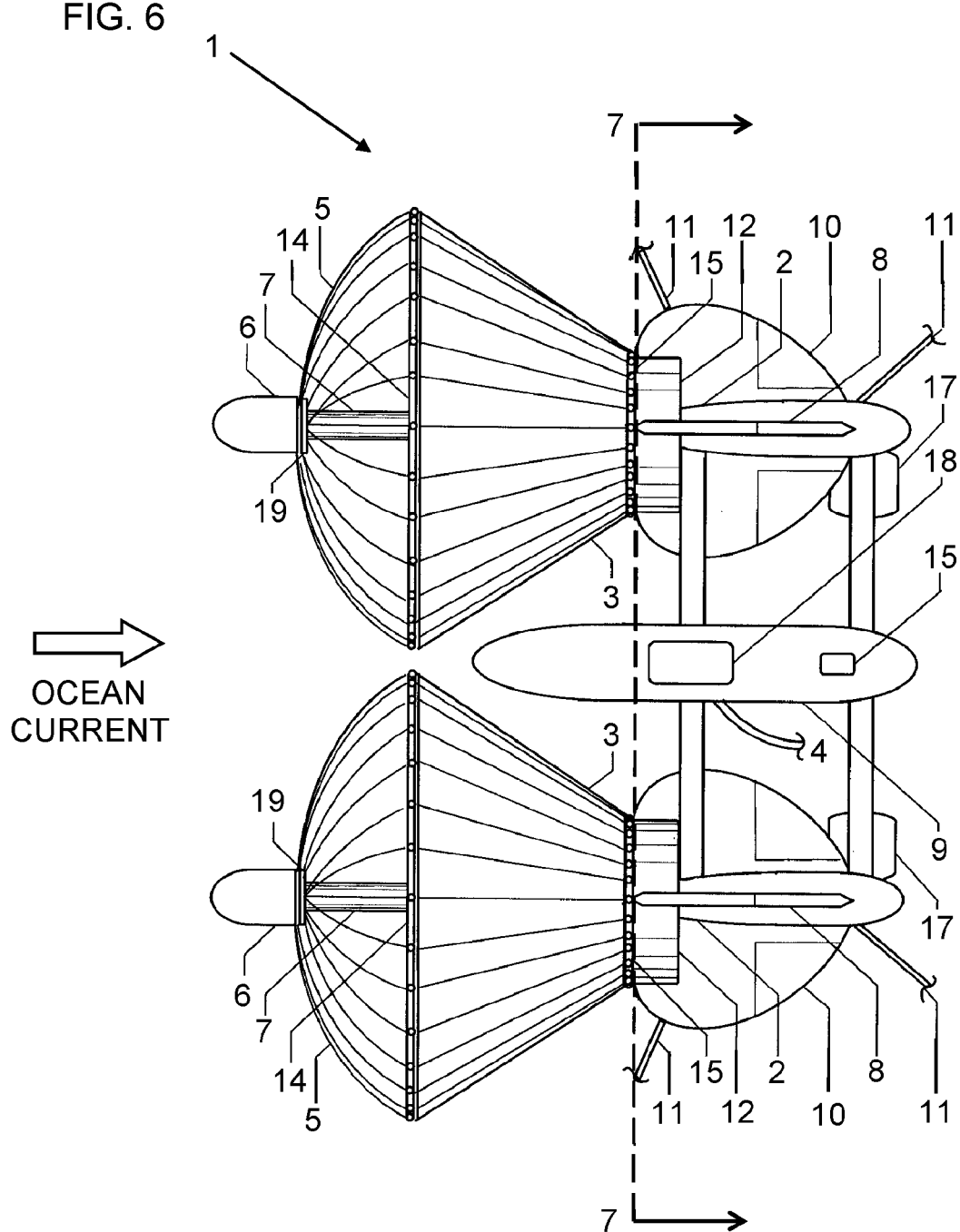

FIG. 6 is a top, plan view of the power generation system 1 located in a submerged position and readied for power generation. A cross section 7 is noted on this drawing that is presented in the following FIG. 7. FIG. 6 shows that power generation system 1 is comprised of two interconnected cone-like systems containing counter rotating turbine 12 units with adjustable blades (not shown here) that are activated rotationally by ocean currents. The purpose of the two counter rotating turbine 12 units is to eliminate torque that may be caused by rotating equipment. The four anchor cable 11 systems appearing in this version are remotely set upon arrival at the offshore site to maintain the power generation system 1 in a fixed and specified location and depth. The current amplifier 3 and marine life protector 5 are then deployed as seen here to initiate power generation. Ocean currents first enter power generation system 1 around bow ballast tank 6, marine life protector hinge mechanism 19 and retraction unit 7, and through the marine life protector 5 and current amplifier hinge mechanism 14 and into the current amplifier 3 where the currents are accelerated to a much higher level as they enter through the turbine hinge mechanism 15, then through the turbine 12 where the hydraulic force of the ocean currents causes rotational movement of the axially connected power generator 2 such that the generated electricity is transported to shore for commercial use by the reelable power and utility line 4. The ocean currents continue movement over flow control surfaces as seen by stabilizer-elevator 10, upper stabilizer rudder 8 and azimuth thruster 17.

In FIG. 6 all operations are monitored through fiber optic communication means of system control 29 contained in power and utility line 4 where electronic operating commands are also sent from the onshore control center to power generation system 1; emergency power may also be transmitted from shore in power and utility line 4. Said communication means may alternatively be sent and received by tube-like snorkel 16 (not deployed here) which also serves as a visual means for surface cameras and a means of conveying air from the surface to the power generation system 1 for ballast control. Air for ballast control purposes may also be provided by auxiliary compressed air bottles mounted within the ballast tank-utilities 9 housing where such control mechanisms are in active communication with onshore control center. The emergency flotation system 18 may be activated automatically or manually by shore management.

Figure 7:
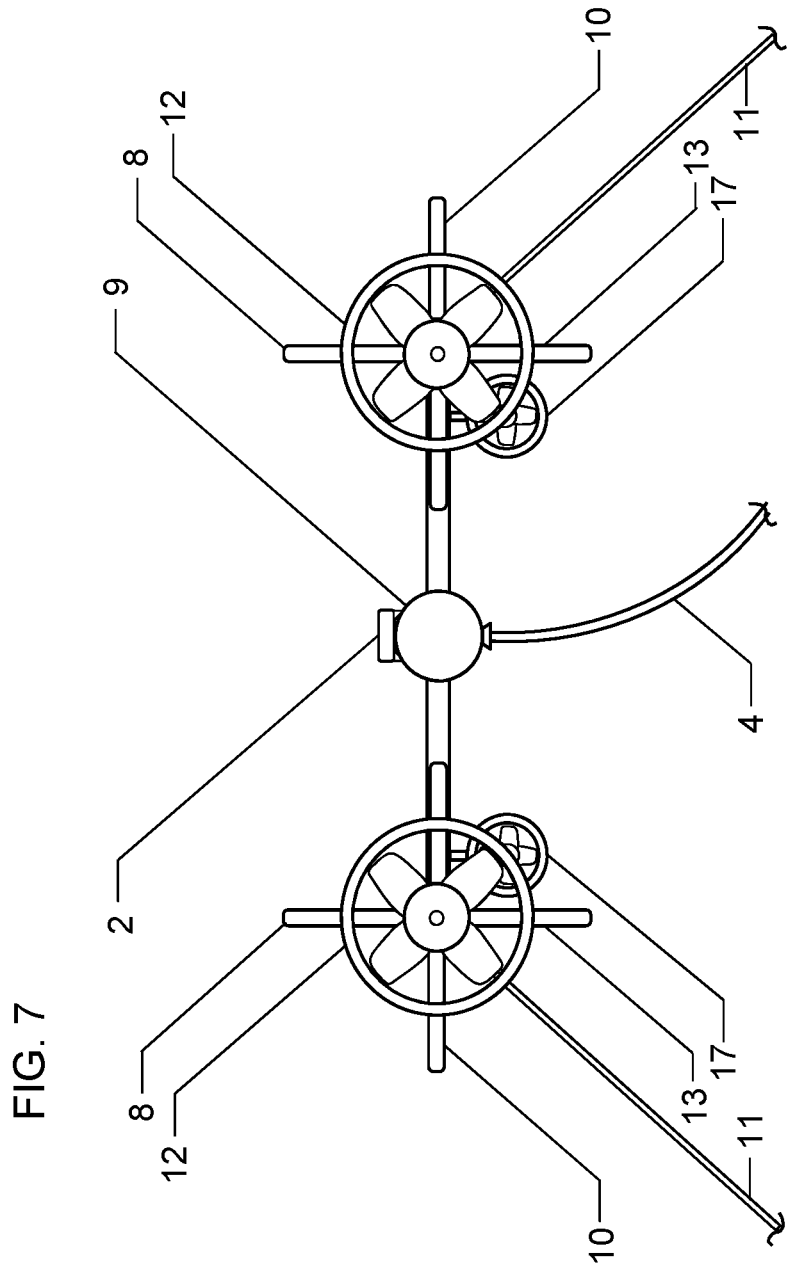

FIG. 7 is a sectional view of the power generation system 1, taken along section line 7-7 of FIG. 6 which is drawn through the primary area of power generation system. Marine current hydraulic forces acting on the blades of turbine 12 cause its rotational movement where such movement is transmitted axially to the coupled power generator 2 (not shown here, but is located directly behind turbine 12) and such power as generated is then combined from both power generator 2 systems (not shown) in ballast tank-utilities 9 where the power is then transmitted to shore for commercial use through reelable power and utility line 4 extending from the bottom of ballast tank-utilities 9 (not shown here). The pitch of the turbine 12 blades is adjustable during rotation for maximum generating efficiency or for transit purposes. In this case, a four-bladed device housed within turbine 12 with a wide blade surface is employed but the turbine could be comprised of a plurality of blades and of various blade designs. The upper stabilizer-rudder 8, the lower stabilizer-rudder 13 and the stabilizer-elevator 10 may provide attitude control of the power generation system 1 while anchored or in transit. However, the anchor cable 11 system shown for this case may be the primary source of system control under certain conditions while anchored since the four anchor cable 11 system lines extending from the power generator 2 housings (not shown here but are located directly behind turbine 12) may be remotely and independently adjusted reelably inward or outward from the housings for attitude control. If required, additional attitude control may also be provided by azimuth thruster 17. Emergency flotation system 18 is mounted on the top side of ballast tank-utilities 9.

Figure 8:
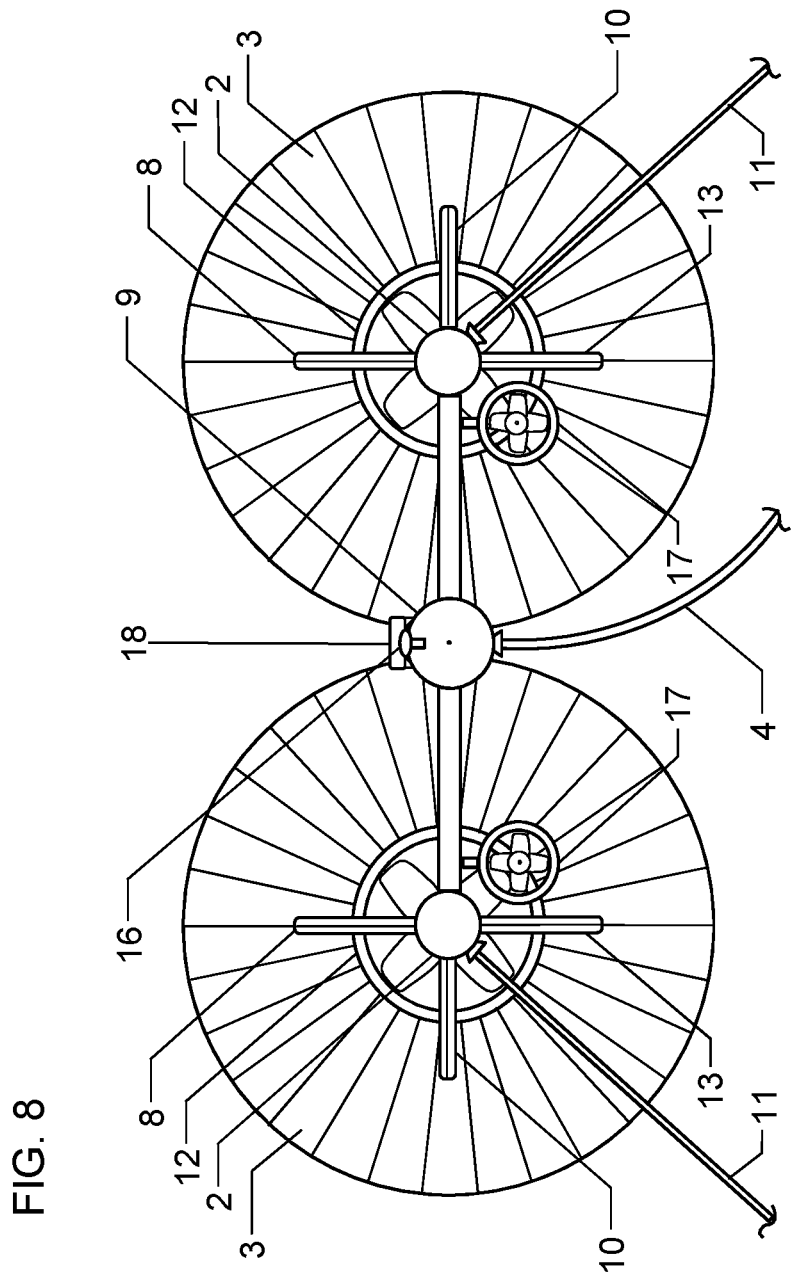

FIG. 8 is a rear view of the power generation system 1, showing the configuration of the twin power units. The rear side of the current amplifier 3 is shown for both of the generators 2 which are comprised of a heavy, foldable polyurethane or other suitable sheet material that is held in a circular fashion by retractable metallic ribbing. The lowermost portion of the electrically-powered azimuth thruster 17 unit is mounted in a similar vertical position at the bottom of turbine 12 and is used primarily to transport the power generation system 1 to selected locations for optimum power production. Said azimuth thruster 17 may also be used for attitude control while the system is anchored. Attitude control may also be done by means of reelably and independently adjusting the anchor cable 11 lengths where such cables are stored on remote controlled drums contained in the power generator 2 housings as shown. As noted above, attitude control may also be exercised through the remote-controlled movement of the upper stabilizer-rudder 8, the lower stabilizer-rudder 13 and the stabilizer-elevator 10 while anchored. Emergency flotation system 18 and snorkel 16 are mounted on the top side of the ballast tank-utilities 9 housing while the power and utility line 4 is reeled from the lower side of the housing where power is transmitted to an onshore delivery point for commercial power delivery.

Figure 9:
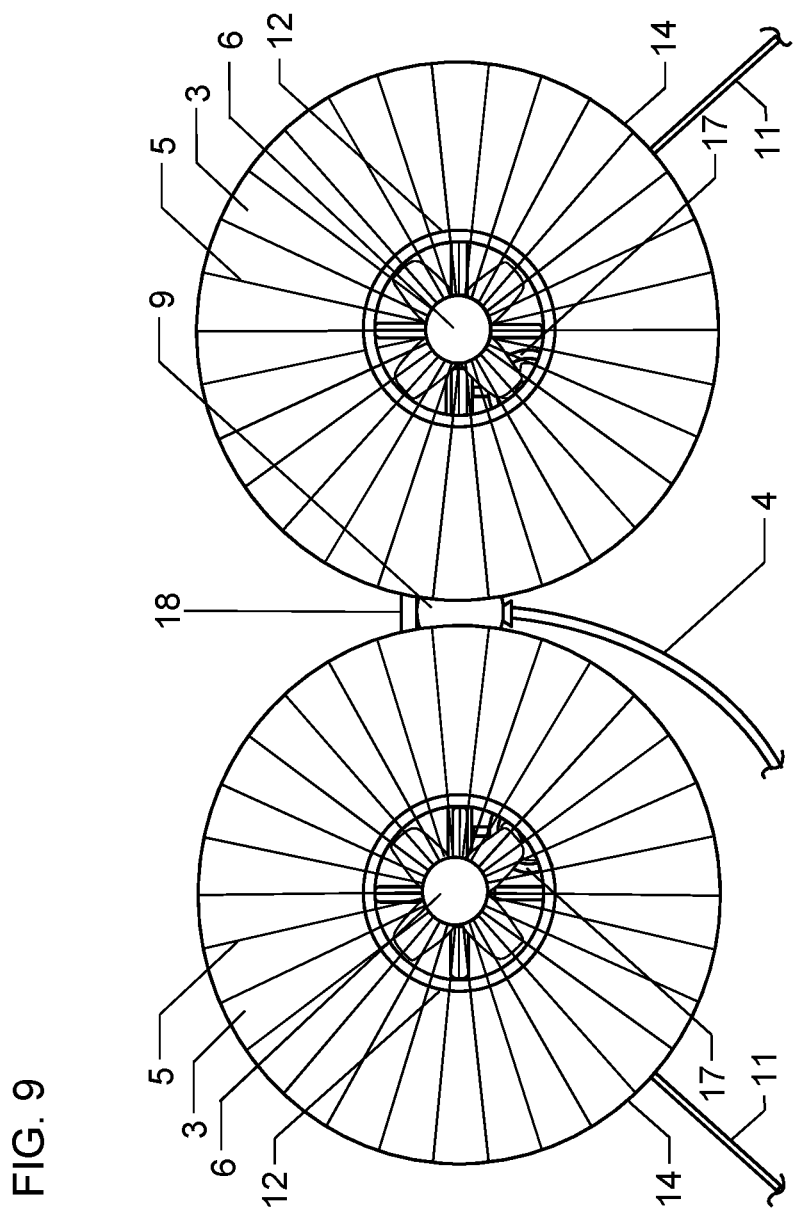

FIG. 9 is a front view of the twin power units of power generation system 1. Offshore ocean currents flow around bow ballast tank 6, current amplifier hinge mechanism 14 and marine life protector 5, then into current amplifier 3 where the currents are significantly accelerated as they pass into turbine 12 that is in operative coupled connection with power generator 2 (not shown here) such that the power generated is combined in ballast tank-utilities 9 where such power is then exported to shore for commercial delivery by reelable power and utility line 4. Two of the four anchor 11 systems are visible in this view as well as a portion of azimuth thruster 17.

Figure 10:
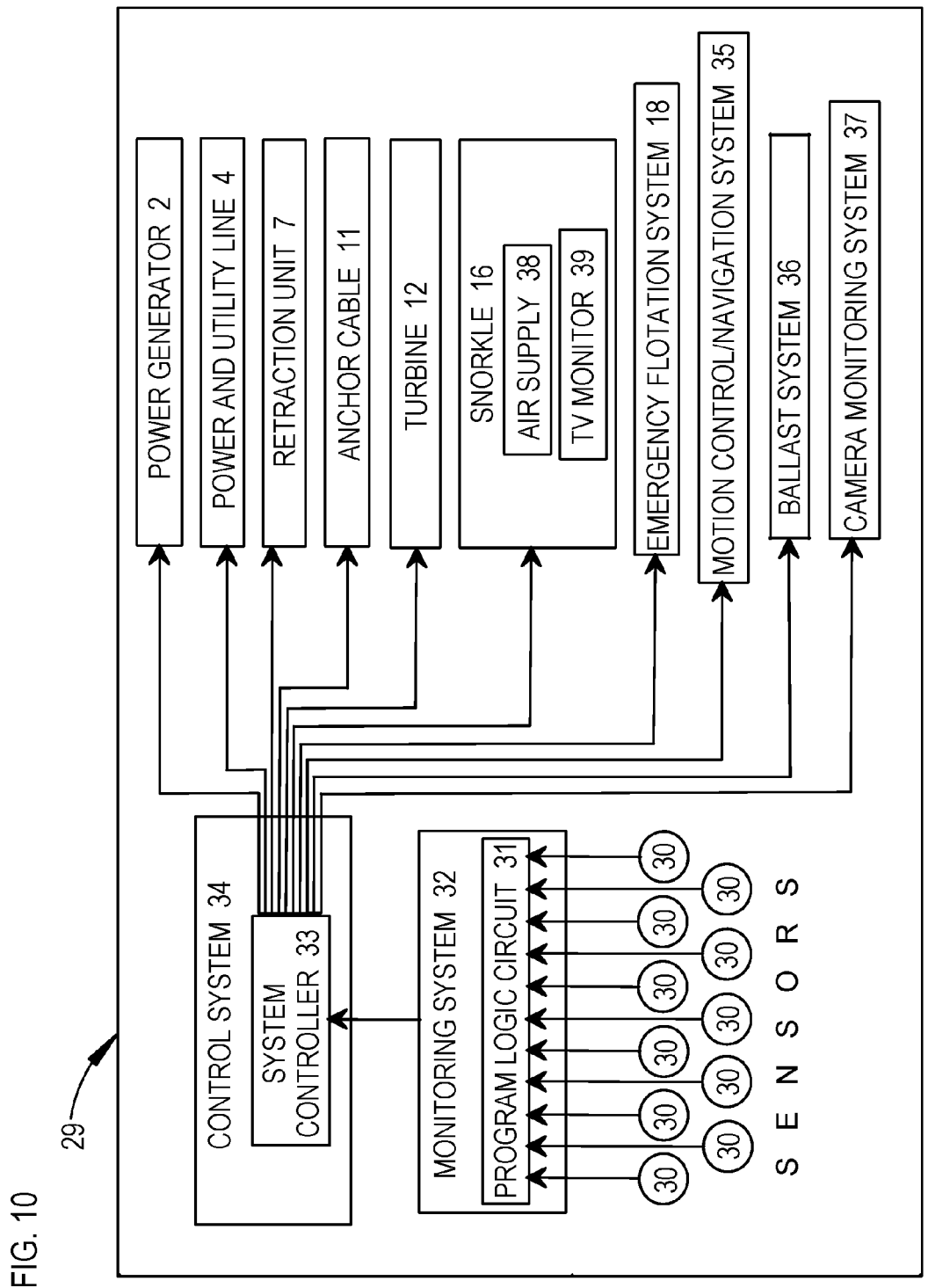

FIG. 10 is a control system block diagram of power generation system 1 in accordance with embodiments of the present disclosure. The generation system control 29 includes a monitoring system 32 comprising a programmed logic circuit 31 and a plurality of sensors 30 positioned in critical areas of power generation system 1 for transmitting operating conditions to, and receiving commands from, the onshore control center. Sensors 30 detect conditions at and around power generation system 1 and are operatively coupled to the programmed logic circuit 31. The sensors 30 deliver information to the programmed logic circuit 31 indicative of the operating state of power generation system 1. The operating state may include either nominal operating conditions or transportation conditions. For example, sensor 30 may transmit signals reflecting that a reduction in ocean current speed has occurred at the anchored position due to meandering current conditions. This information may be transmitted by sensor 30 as analog or digital signals utilizing parallel or serial transfer, and may be sent as data packets. Said data may be acted upon automatically by the program logic circuit 31 or manually by onshore management through monitoring system 32 thus causing power generation system 1 to be activated to transportation conditions through system controller 33 where the generation system is remotely transported to a newly selected location through the actions of the retraction unit 7, power generator 2, power and utility line 4, anchor cable 11, turbine 12, snorkel 16, motion control/navigation system 35, ballast system 36 and camera monitoring system 37. The signals may be implemented in any manner as will occur to one of skill in the art.

The program logic circuit 31 further includes a memory (not shown) storing a data structure associating received signal values with an operating condition value. The programmed logic circuit 31 includes a memory access circuit (not shown) operatively coupled to the memory configured to access the data structure and return the operating condition value associated with the operating state. The monitoring system 32 may transmit the operating condition data to system controller 33.

A system controller 33 of the control system 34 may receive operating condition values from monitoring system 32. The system controller 33 may be activated to send signals to components of the ballast system 36, such as, for example, the pumping system contained in ballast tank-utilities 9 (not shown), to employ the ballast system 36 to move to a revised operating depth when conditions necessitate. Such a revision could further activate the system controller 33 to send signals to power generator 2, power and utility line 4, anchor cable 11, turbine 12, snorkel 16, motion control/navigation system 35 and camera monitoring system 37. In the event of transport of power generation system 1 to an alternate location the system controller 33 could further activate retraction unit 7 in addition to the above systems. Should it be necessary, emergency flotation system 18 may be activated automatically or manually through system controller 33.

Memory may be embedded in programmed logic circuit 31 in whole or in part, or may be a separate element operatively coupled to programmed logic circuit 31. Memory may include any forms of volatile random access memory ('RAM') and some form or forms of non-volatile computer memory such as a hard disk drive, an optical disk drive, or an electrically erasable programmable read-only memory space (also known as 'EEPROM' or 'Flash' memory), or other forms of random access memory ('RAM').

Figure 11:
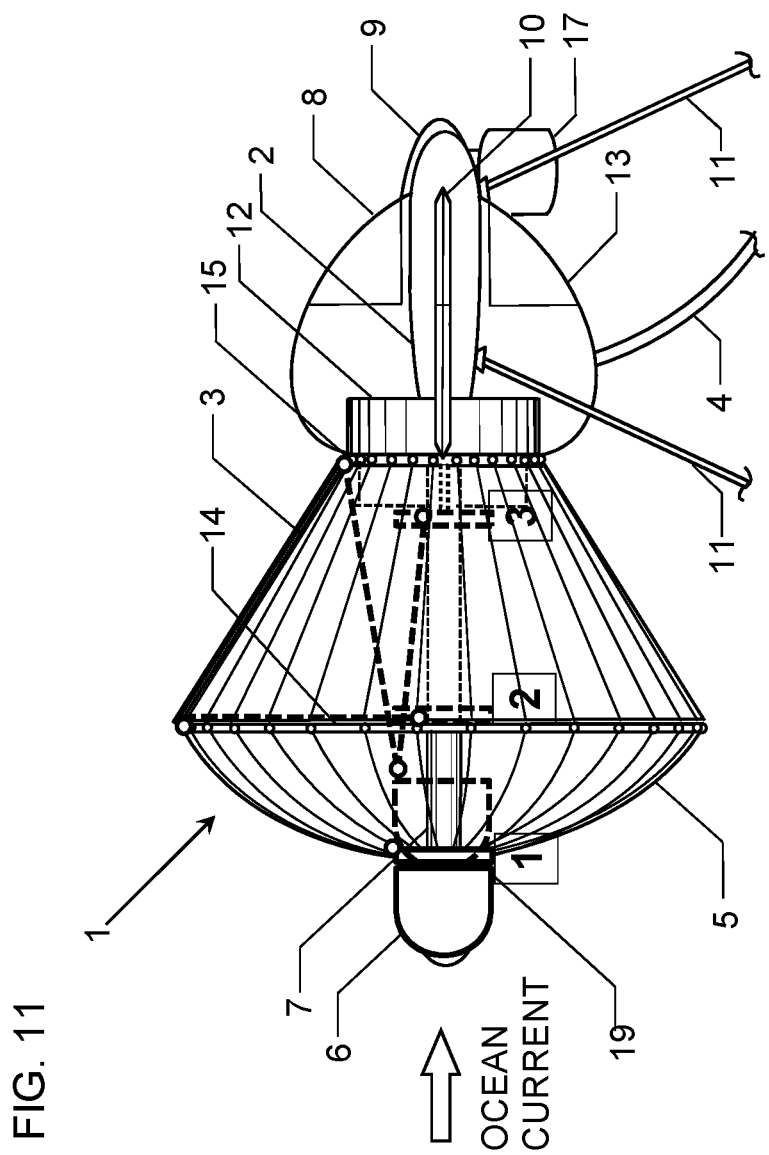

FIG. 11 is a side elevation view of one of the power generation system 1 and has hidden lines which show operation of the retraction unit 7 for the marine life protector 5. Various positions for the marine life protector are shown, in which Position 1 is fully deployed, Position 2 is intermediate, and Position 3 is fully retracted. The basal point connection of the marine life protector 5 is attached to the marine life protector hinge mechanism 19 and the marine life protector 5 moves down the side of the hinge mechanism 19 between Position 1 and Position 2 during retraction.

Figure 12:
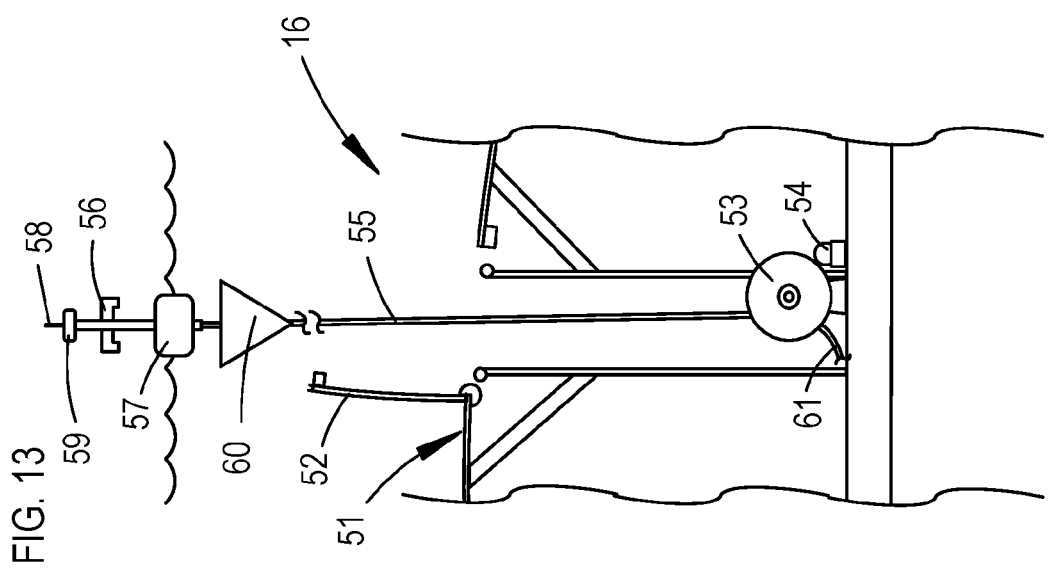
Figure 13:
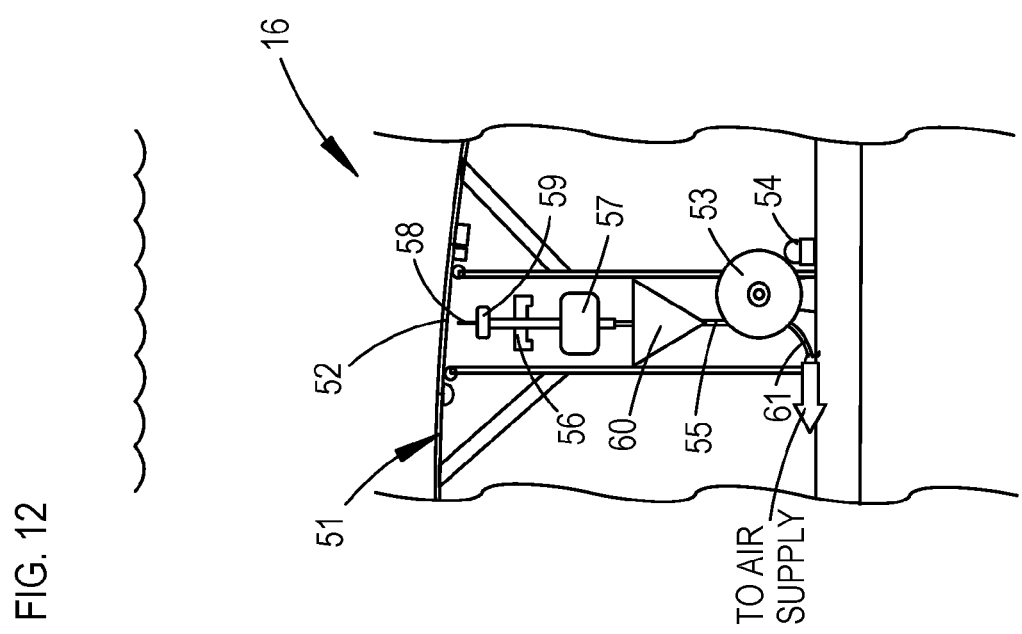

FIG. 12 and FIG. 13 are partial cutaway drawings of the snorkel 16 which is located near the rear topside of the ballast tank-utilities 9. FIG. 12 shows the snorkel 16 in a retracted position and FIG. 13 shows the snorkel 16 in an extended, deployed position. A housing 51 has a hatch 52 from which the snorkel 16 is deployed by means of spooling a snorkel line 55 from a snorkel reel 53, powered by an electric motor 54. The snorkel 16 has an air intake 56 and a float 57. The float 57 provides buoyancy for deploying the snorkel line 55 from the snorkel reel 53. A radio antenna 58 and video camera with microphone 59 are mounted atop the snorkel 16, and may be rotated 360 degrees. An entry guide cone 60 is provided for assisting entry of the snorkel 16 back into the housing 51 when the snorkel line 55 is being retracted back onto the snorkel reel 53. An air supply outlet 61 is provided at the snorkel reel 53.

Figure 15:
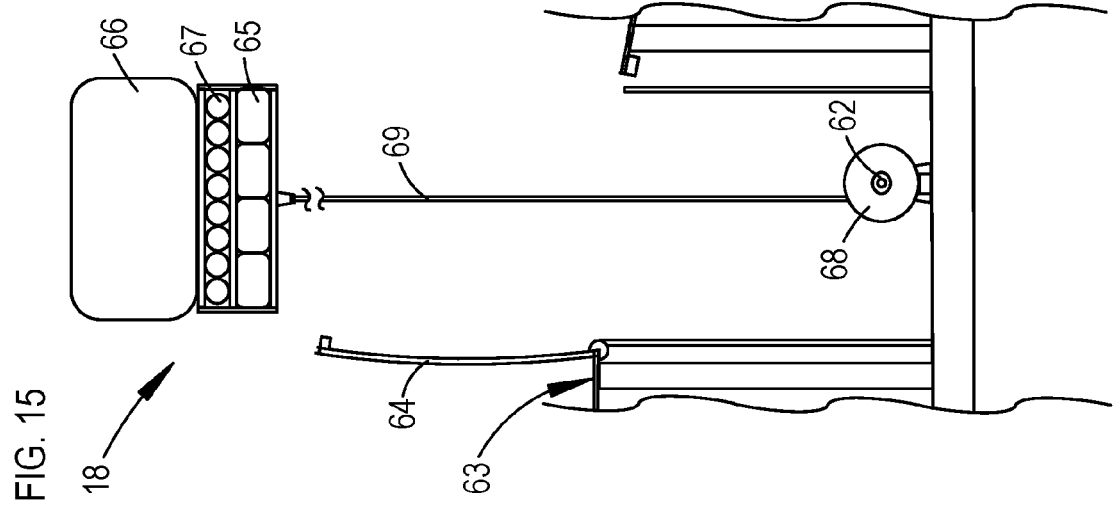
Figure 14:
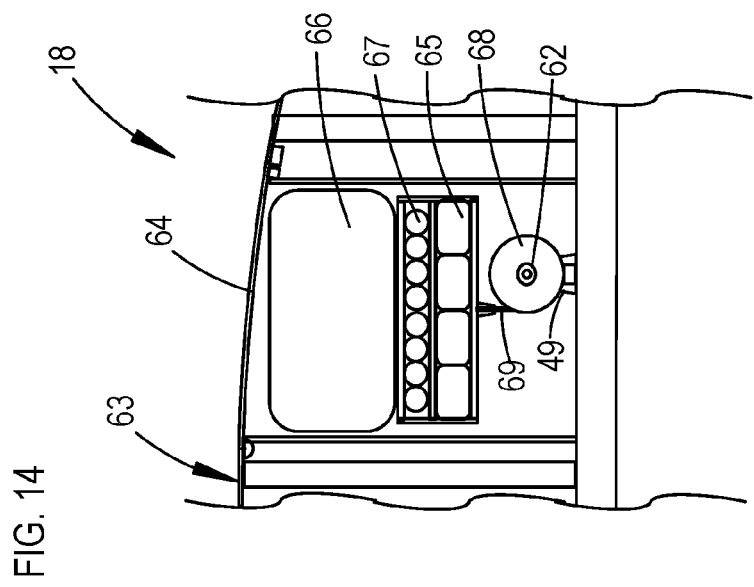

FIG. 14 and FIG. 15 are partial cutaway drawings of the emergency flotation system 18. The flotation system has a housing 63 with an upwardly disposed deployment hatch 64. Both permanent floats 65 and inflatable bladders 66 are provided, with the inflatable bladders 66 preferably initially in a deflated, packaged condition. An end view shows the cylindrical high pressure bottles 67 that are provided for inflating the inflatable bladders 66. A cable storage reel 68 is provided for spooling a tethering cable 69, with a cable release 49 for deploying the emergency flotation system 18. A motor 62 is provided for selectively retracting the tethering cable 69 after deployment. Operation of the emergency flotation system 18 is done manually or automatically through sensors and through system controls signals causing the activation of the reel release that will signal the flotation system to be buoyed to the surface by the floats 65. The bladders 66 will then be automatically inflated by the bottle gas 67. This is a "wet" system. The above view is near the rear topside of the ballast tank utilities 9. These bladders will be automatically inflated with bottle gas upon reaching the surface and will enlarge by a factor of about 400.

Figure 16:
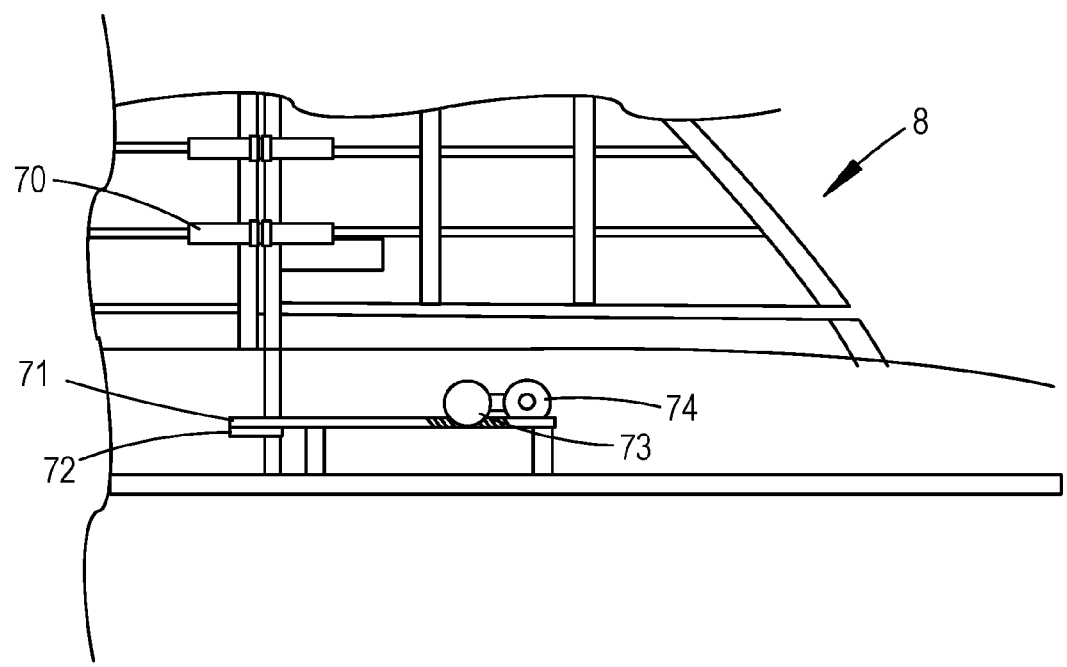

FIG. 16 is a cutaway drawing for the upper stabilizer-rudder 8, located near the rear of the power generator 2. The stabilizer-rudder 8 has a hinge and support assembly 70, pivotally connecting a movable portion to a stationary portion of the stabilizer-rudder 8. A power shaft 71 is connected at one end to a worm gear box driven by a two-way electric motor 74 with the other end movably affixed to a bell crank 72 in order to provide sideways movement of the movable portion of the stabilizer-rudder 8. The mechanical configuration for the movement of the stabilizer-rudder 8 is virtually identical for stabilizers 10 and 13.

Figure 17:
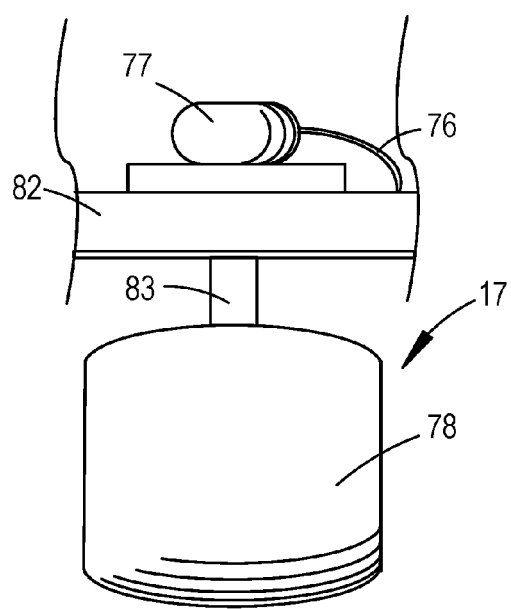
Figure 18:
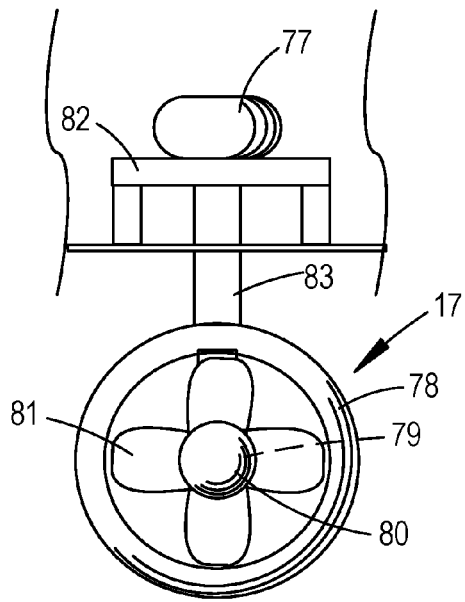

FIG. 17 and FIG. 18 are partial, cutaway views of one of the azimuth thrusters 17. A power cable 76 provides power to a 360 degree horizontal rotator 77. The rotator 77 is mounted to a frame 82 and has a rotary portion which is connected to a shaft 83. An electric motor 79 and a thruster cowling 78 are connected to the lower end of the shaft 83. The rotator is selectively powered to rotate the shaft 83 with the thruster cowling 78 and an electric motor 79 beneath the frame 82. A rotary of the electric motor 79 is connected to a drive propeller 81. A nose cone 80 is mounted to an outward end of the electric motor 79. The horizontal rotator 77 enables the thruster 17 to be rotated 360 degrees for complete control of horizontal transit of the power generation system 1.

Figure 19:
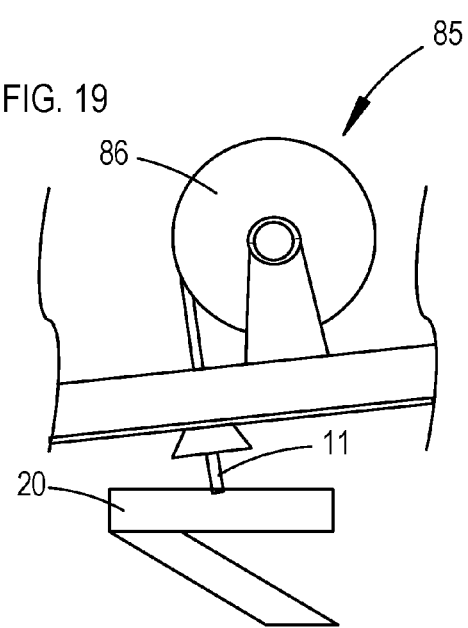
Figure 20:
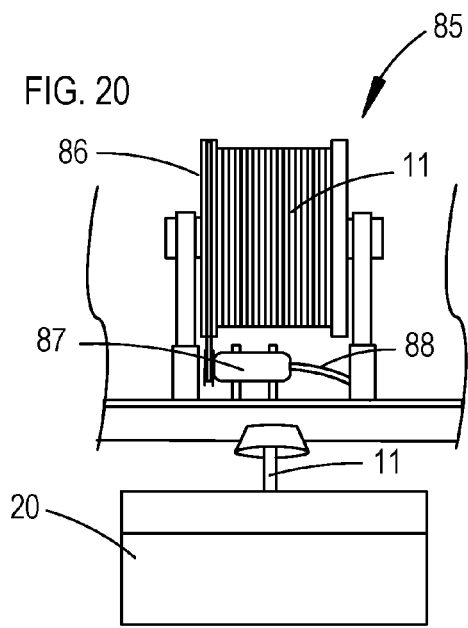

FIG. 19 and FIG. 20 are partial cutaway drawings of an anchor cable reel 85 for selectively spooling the anchor cable 11 to secure the power generation system 1 in selected positions within ocean currents. The anchor cable reel 85 is preferably mounted directly to a frame of the power generation system 1 on the forward and the rearward ends and an underside of the power generation system 1. The anchor cable reel 85 has a cable spool 86 about which the anchor cable 11 is selectively wound or from which the cable 11 is deployed. An electric motor 87 is operatively connected to the cable spool 86. Power is preferably supplied to the electric motor 87 by a power cable 88.

Example Application

As an example potential application area of the amount of power that could be produced from the present invention, the Florida Straits is an eastern offshore Florida region that is axially oriented north-south and contains some of the world's fastest marine currents and are relatively close to shore. These currents carry virtually all of the Gulf of Mexico water mass through the narrow straits area and north to the New England regions and beyond. Other significant world wide areas include the Kuroshio, offshore eastern Japan and Agulhas Current, offshore eastern Africa. This example application also demonstrates the increase in current velocity and corresponding power increase resulting from the use of the Bernoulli Principle.

The Florida Straits have been the subject of a number of oceanic studies owing to the significant potential of power that might be converted from hydrodynamic energy carried by the currents that may be subject to meandering. This power could be utilized by the large population centers in eastern Florida, such as Miami, that is located in the straits region. These currents have a maximum velocity of about 5.0 knots (2.57 meters/second). The area for this example is located east of Miami on an east-west line beginning about 16 kilometers east of Miami and ending some 42 kilometers east of Miami, thus resulting in a width of approximately 26 kilometers covering the fastest part of, and perpendicular to, the Florida Straits. The current velocity over the 26 kilometer width averages about 3.50 knots (1.80 meters/second) where the currents are subject to periodic meandering of varying degrees. The north-south length of the Florida Straits is over 1,000 kilometers while the depth is in the order of 400 to 900 meters.

The following would apply to the present invention, a counter-rotating, twin turbine, self-propelled, remote controlled submersible power generating system that is capable of self-transiting in meandering currents:

Given:

| | |
|---|---|
| Velocity of Ocean Current, | $v_C$ = 1.80 M/sec (3.50 kts) |
| Diameter of Inlet (current amplifier 3), | $D_i$ = 60.97 M (200 Ft.) |
| Area of Inlet (current amplifier 3), | $A_i$ = 2,919.6 M$^2$ (31,416 Ft.)$^2$ |
| Diameter of Outlet (turbine 12), | $D_T$ = 18.29 M (60 Ft.) |
| Area of Outlet (turbine 12), | $A_T$ = 262.7 M$^2$ (2,827 Ft.)$^2$ |

-continued

| | |
|---|---|
| Ratio, | $A_I$ to $A_T$ = 11.11:1.00 |
| Density of Seawater, | $d_S$ = 1,023 Kg/M³ |
| System Hydraulic Estimated Efficiency, | $E_H$ = 80% |
| Turbine Estimated Efficiency, | $E_T$ = 90% |
| Generator Estimated Efficiency, | $E_G$ = 95% |
| Combined Efficiencies, | $E_C$ = Product of $[E_H][E_T][E_G]$ = 68.4% |
| Depth to Ocean Floor, | 380 M (1,246 Ft.) |
| Depth to Top of Power Generation, | 55 M (180 Ft.) |

System 1 to Avoid Surface Traffic

Determine:

Power Available at Inlet (current amplifier 3), $P_I$=W (watts)

Power to be Delivered (at export, turbine 12), $P_T$=W (watts)

Where, $P_T=[P_I][E_C]$

Assuming seawater has negligible compressibility for this estimate, the power available from one power generator at the inlet cross section area based on a steady-state mass flow rate is:

$$P_I = [0.5][d_S][A_i][v_C^3]$$
$$= [0.5][1,023 \text{ Kg/M}^3][2,919.6 \text{ M}^2][1.80 \text{ M/sec}]^3$$
$$= 8,709,360 \text{ W}$$

Then delivered power becomes, $$PT = [8,7909,360 \text{ W}][0.684]$$
$$= 6,000,000 \text{ W (rounded) power from one power generator}$$

2 delivered into power and utility line 4.

Thus, 12,000,000 watts would be the total power produced by twin generators 2 as delivered into power and utility line 4. This delivered power would be sufficient to service about 10,000 average households.

In this example it is obvious that several power generation system 1 units could be coupled to deliver significant amounts of power for the Miami area.

It should be noted that without the use of current amplifier 3 and the intake of seawater currents through the turbine 12 only, the above 12,000,000 W of power would be reduced to only about 1,567,000 W or a reduction of some 87% using the above equations.

$v_T$, the current velocity at turbine 12 entry of is also increased substantially compared to the 1.80 M/sec velocity at current amplifier 3 as noted from the equation of continuity:

$$[A_T][v_T]=[A_I][v_C]$$

Where,

Area of Inlet (current amplifier 3), $A_I$=2,920 M²

Area of Outlet (turbine 12)=$A_T$=263 M²

$v_T$=[2,920 M²][1.80 M/sec]/[263 M²]=19.98 M/sec

After considering the effects of $E_H$, $V_T$ reduces to approximately 16 M/sec, which is about nine times as great as the 1.80 M/sec seawater velocity. This nine-fold increase in velocity is the result of seawater conically passing through current amplifier 3 where the Bernoulli Principle is applied.

The discussion above has focused primarily on embodiments of the invention employing renewable power generation by means of a tethered, submerged generating system for converting hydrodynamic energy from high sea currents to electricity for lower cost to the consumer. The invention is self propelled in order to mobilize and to redeploy to alternate locations since many desirable locations for offshore power generation are in regions of meandering currents. The invention also has the means to significantly increase the speed of ocean currents passing through the system to much higher levels to allow greater amounts of power generated and to permit its operating in areas of lower current speeds. It should be understood that the inventive concepts disclosed herein are capable of many modifications. To the extent such modifications fall within the scope of the appended claims and their equivalents, they are intended to be covered by this patent.

The present invention provides the following unique features for offshore, subsea devices for generating power:

1. ROBOTIC OPERATION—All of the inventions operations may either be preprogrammed or conducted manually by means of either a connecting power delivery cable to shore control or by radio control through a snorkel (See 6, below).

2. CURRENT AMPLIFIER—A retractable cone-like device constructed of a flexible material with a rigid framework and configured for ocean currents entering the large end of the cone and expelled at the small end at a much higher velocity in accordance with the Bernoulli Principal, first published in 1738. The resulting higher velocity significantly increases the power density of current entering the turbine for much greater amounts of power production at a lower cost.

3. MARINE LIFE PROTECTOR—A grid-like cover that fits over the current amplifier to prevent marine life from entering the current amplifier/turbine.

4. RETRACTION UNIT—A device that retracts the current amplifier and marine life protector resulting in a streamlined body suitable for transportation while submerged. The current amplifier and marine life protector are also deployed by the retraction unit at the selected location of anchoring.

5. SELF-PROPELLED FEATURE—The invention can move independently to selected locations to position itself in areas of faster meandering marine currents that often behave in a manner similar to atmospheric "jet streams." This self-propelled means is provided by azimuth thrusters that move the device in any lateral direction in concert with the air/water ballast system for precise positioning of the invention for optimum power production.

6. SNORKEL—A tubular device extended vertically from the invention to the atmosphere to provide ballast air and a means of radio communication with shore management.

7. ANCHOR SYSTEM—That is remote controlled from the shore management location for either setting anchors in a selected pattern or retrieving them for transit.

Although the preferred embodiment has been described in detail, it should be understood that various changes, substitutions and alterations can be made therein without departing from the spirit and scope of the invention as defined by the appended claims.

What is claimed is:

1. A robotic subsea power generation system for positioning in ocean currents to generate power, comprising:

a generating unit having a turbine mounted thereto and an electric generator coupled to said turbine for generating electric power;

a current amplifier mounted to said generating unit to direct a portion of the ocean currents through said turbine, said current amplifier having a rigid framework with an outer cover formed of a flexible material; and wherein in a deployed position, said current amplifier has a conically-shaped structure which decreases in cross-sectional area from an entrance section to an exit section of said current amplifier;

wherein said current amplifier is selectively retractable from said deployed position to a retracted position, wherein in said retracted position, said entrance section of said current amplifier is substantially closed, and wherein said current amplifier forms a streamlined body that reduces the drag of the generating unit in moving through water.

2. The subsea power generation system according to claim 1, further comprising a control system which includes one or more sensors and a monitoring system which are operable to track the ocean current, wherein said control system further includes a system controller which is operable in a first mode to automatically reposition the generating units for maximizing power output, and is operable in a second mode in which said subsea power generation system is manually and remotely operated by a person located ashore.

3. The subsea power generation system according to claim 2, wherein said control system includes one or more thrusters which position the generating units in an optimal location and controls one or more ballast tanks which position the generating units at an optimal depth within a selected one of the ocean currents.

4. The subsea power generation system according to claim 2, wherein in said second mode, said system controller receives commands from a person located onshore, wherein the system controller manually and remotely controls the movement of said generating unit to optimal depths and to optimal positions within a selected one of the ocean currents in response to said commands.

5. The subsea power generation system according to claim 1, wherein the subsea power generation system is self-propelled and further comprises a thruster mounted to said generating unit and providing motive force which moves said generating unit from a first location which is outside a selected one of the ocean currents to a second location which is within the selected one of the ocean currents.

6. The subsea power generation system according to claim 5, wherein said thruster comprises an electric motor connected to a shaft which connects to a drive propeller, wherein said electric motor turns said shaft to power said drive propeller to selectively move said generating unit from the first location to the second location.

7. The subsea power generation system according to claim 1, further comprising a marine life protector which extends proximate to said current amplifier, and has a mesh formed of a rigid metal gridwork which extends over an entrance of said current amplifier, wherein said metal gridwork is sized for passing seawater and the ocean currents and to not pass marine life exceeding sizes of apertures in said metal gridwork.

8. The subsea power generation system according to claim 7, wherein said marine life protector is collapsible into said current amplifier in an umbrella-like fashion, wherein when said current amplifier is in said retracted position, said metal gridwork is collapsed and housed within said streamlined body formed by said current amplifier.

9. The subsea power generation system according to claim 1, further comprising a snorkel, wherein the snorkel comprises a tubular snorkel line having an intake end with a float connected thereto and an outlet end connected to a ballast compressor, wherein the snorkel is alternately retracted and spooled onto a snorkel reel or deployed from the snorkel reel wherein the float lifts the intake end of the snorkel line to a sea surface, thereby enabling air from the surface of the ocean to be communicated to the ballast compressor.

10. The subsea power generation system according to claim 9, further comprising a reel motor coupled to the snorkel reel and configured to alternately retract or deploy the snorkel line from the snorkel reel, wherein said reel motor is an electric motor.

11. The subsea power generation system according to claim 1, further comprising one or more ballast tanks, wherein said control system control is operable to maintain said generating unit and current amplifier at depths beneath a sea surface which are sufficient to avoid the bottoms of the largest ocean vessels.

12. The subsea power generation system according to claim 1, further comprising a plurality of anchors and anchor cable reels mounted to said power generation units, with anchor cables spooled onto said anchor cable reels and said anchors secured to respective terminal ends of said anchor cables, and further including motors for powering said anchor cable reels to selectively tension and release respective ones of said anchor cables to position the depth and attitude of said turbines of said power generation units in selected locations within said ocean currents.

13. The subsea power generation system according to claim 12, wherein said motors for powering said anchor cable reels are electric motors.

14. The subsea power generation system according to claim 1, further comprising an emergency flotation system having an inflatable bladder and high pressure bottles containing a gas, wherein said control system is coupled to said inflatable bladder and are operable to selectively release said gas into said inflatable bladder, thereby adjusting the buoyancy of the subsea power generation system.

15. The subsea power generation system according to claim 14, wherein said emergency flotation system further comprises permanent floats which provide minimum buoyancy.

16. The subsea power generation system according to claim 15, wherein said emergency flotation system further comprises a cable reel for releasing a cable tethering said inflatable bladder and permanent floats to said power generation unit.

* * * * *